US012598409B2

(12) United States Patent
Yu

(10) Patent No.: US 12,598,409 B2
(45) Date of Patent: Apr. 7, 2026

(54) IN-EAR WEARABLE DEVICE

(71) Applicant: Listening Wisdom (Nanjing) Technology Co., Ltd., Nanjing (CN)

(72) Inventor: Chunhong Yu, Nanjing (CN)

(73) Assignee: Listening Wisdom (Nanjing) Technology Co., Ltd., Nanjing City (CN)

( * ) Notice: Subject to any disclaimer, the term of this patent is extended or adjusted under 35 U.S.C. 154(b) by 197 days.

(21) Appl. No.: 18/188,055

(22) Filed: Mar. 22, 2023

(65) Prior Publication Data

US 2023/0308794 A1 Sep. 28, 2023

(30) Foreign Application Priority Data

Mar. 22, 2022 (CN) ......................... 202210286752.3

(51) Int. Cl.
*H04R 1/10* (2006.01)

(52) U.S. Cl.
CPC ......... *H04R 1/1016* (2013.01); *H04R 1/1091* (2013.01); *H04R 2420/07* (2013.01)

(58) Field of Classification Search
CPC .. H04R 1/1016; H04R 1/1041; H04R 1/1091; H04R 1/2823; H04R 2420/07
USPC ......................................... 381/337, 372, 379
See application file for complete search history.

(56) References Cited

U.S. PATENT DOCUMENTS 2,335,389 A * 11/1943 Coons ...................... F25B 15/10 62/148
5,961,443 A 10/1999 Rastatter et al.
6,549,635 B1 * 4/2003 Gebert ................. H04R 25/652 381/322

(Continued)

FOREIGN PATENT DOCUMENTS

CN 101709787 * 5/2010
DE 4008982 * 9/1991

(Continued)

OTHER PUBLICATIONS

Masahiro Watanabe, Notice of Reasons for Refusal of Japanese Patent Application No. 2023-044667, dated Apr. 30, 2024, Japan.

(Continued)

*Primary Examiner* — Norman Yu
(74) *Attorney, Agent, or Firm* — Cherskov Flaynik & Gurda, LLC

(57) ABSTRACT

The disclosure relates to an in-ear wearable device, including: a customized housing having a housing wall and an inner cavity; a panel; a ventilation hole at least partially disposed in the customized housing and partially formed in the housing wall; and a ventilation rate adjusting device mounted in the ventilation hole. When in use, the customized housing includes a first portion inserted into a user's acoustic meatus, and a second portion exposed to the external. The ventilation hole and the ventilation rate adjusting device constitute at least a part of a ventilation channel isolated from the inner cavity. The ventilation channel fluidly connects the acoustic meatus to the external when in (Continued)

use. The ventilation rate adjusting device includes an operating portion, and the ventilation rate of the ventilation channel may be manually adjusted via the operating portion to adjust audio characteristics of the in-ear wearable device.

6 Claims, 26 Drawing Sheets

(56) References Cited

U.S. PATENT DOCUMENTS

| | | | | |
|---|---|---|---|---|
| 10,045,133 | B2 | 8/2018 | Bauman et al. | |
| 2002/0027996 | A1 | 3/2002 | Leedom et al. | |
| 2011/0182451 | A1* | 7/2011 | Vaarbroe | H04R 25/652 381/322 |
| 2012/0114160 | A1* | 5/2012 | Lin | H04R 1/1091 381/380 |
| 2016/0127818 | A1* | 5/2016 | Ambrose | H04R 1/1066 381/380 |
| 2016/0227333 | A1* | 8/2016 | Babico | H04R 25/609 |
| 2019/0379962 | A1* | 12/2019 | Navid | H04R 1/38 |
| 2022/0417683 | A1* | 12/2022 | Braband | H04R 25/652 |

FOREIGN PATENT DOCUMENTS

| | | | |
|---|---|---|---|
| DE | 4008982 | A1 | 9/1991 |
| WO | 2019052715 | A1 | 3/2019 |
| WO | 2021098949 | A1 | 5/2021 |

OTHER PUBLICATIONS

Communication from European Patent Office with Search Report of EP Patent Application No. 23162598.9, dated Aug. 21, 2023.

Michael Borowski, Communication from European Patent Office regarding EP Patent Application No. 23162598.9, dated Apr. 4, 2025, European Patent Office, Munich, Germany.

* cited by examiner

IN-EAR WEARABLE DEVICE

This application claims priority to Chinese Patent Application No. 202210286752.3 filed on Mar. 22, 2022, currently pending, which is incorporated herein by reference in its entirety.

TECHNICAL FIELD

The disclosure relates to wearable devices, and particularly to an in-ear wearable device.

BACKGROUND

As the application scenarios of mobile devices such as smart phones are becoming extensive, and people use more and more audio and video services, wireless earphones are rapidly popularized because of the advantages such as portability and no entanglement, and TWS (True Wireless Stereo) Bluetooth earphones have become mainstream products of the wireless earphones due to the advantages such as short delay and good sound quality. However, the TWS Bluetooth earphones at present are most of standard sizes, which will cause discomfort to wearing users' ears after being worn for a long time, thereby limiting the wearing time and the application scenarios. In addition, when an in-ear wearable device is worn for a long time, an external acoustic meatus will be closed to generate an ear occlusion effect, such that the pressures inside and outside the ear are unbalanced and reduce the comfort, and moisture and infection may be caused due to the lack of ventilation in the acoustic meatus.

Therefore, there is a need for an in-ear wearable device and an in-ear wireless earphone with improved wearing comfort.

SUMMARY

An objective of the disclosure is to provide an in-ear wearable device capable of improving the wearing comfort. Another objective of the disclosure is to provide an in-ear wearable device capable of being adapted to different use scenarios. Another objective of the disclosure is to provide an in-ear wearable device capable of ventilating an acoustic meatus. Another object of the disclosure is to provide an in-ear wearable device capable of defining different audio effects.

An aspect of the disclosure provides an in-ear wearable device, comprising: a customized housing having a housing wall and an inner cavity surrounded by the housing wall, wherein the customized housing comprises a first portion for being inserted into an acoustic meatus of a user and matching with a shape of the acoustic meatus, and a second portion for being exposed to an external environment when the first portion is inserted into the acoustic meatus; a panel mounted to the customized housing at an open end of the second portion away from the first portion; a ventilation hole at least partially disposed in the customized housing, wherein a section of the ventilation hole disposed in the customized housing is formed in the housing wall; and a ventilation rate adjusting device mounted in the ventilation hole, wherein the ventilation hole and the ventilation rate adjusting device constitute at least a part of a ventilation channel which is isolated from the inner cavity of the customized housing, the ventilation channel is configured to fluidly connect the acoustic meatus of the user to the external environment when the user wears the in-ear wireless earphone, the ventilation rate adjusting device comprises an operating portion located on the second portion and exposed from an outer surface of the customized housing, and the ventilation rate adjusting device is configured to be manually operable to adjust a ventilation rate of the ventilation channel with the operating portion to adjust audio characteristics of the in-ear wearable device.

According to some embodiments of the disclosure, the ventilation channel is completely disposed in the customized housing.

According to some embodiments of the disclosure, the ventilation channel comprises a first section disposed in the customized housing and a second section disposed in the panel.

According to some embodiments of the disclosure, the ventilation hole comprises a first orifice for being exposed to the acoustic meatus and a second orifice for being exposed to the external environment when the user wears the in-ear wearable device, and the ventilation rate adjusting device is disposed at the second orifice of the ventilation hole.

According to some embodiments of the disclosure, the ventilation hole comprises a first orifice for being exposed to the acoustic meatus and a second orifice for being exposed to the external environment when the user wears the in-ear wearable device, and the ventilation rate adjusting device is disposed at a middle position of the ventilation hole spaced apart from both the first orifice and the second orifice.

According to some embodiments of the disclosure, the ventilation hole comprises a first orifice for being exposed to the acoustic meatus and a second orifice for being exposed to the external environment when the user wears the in-ear wearable device, and the operating portion of the ventilation rate adjusting device is disposed at the second orifice of the ventilation hole.

According to some embodiments of the disclosure, the ventilation hole comprises a first orifice for being exposed to the acoustic meatus and a second orifice for being exposed to the external environment when the user wears the in-ear wearable device, and the operating portion of the ventilation rate adjusting device is disposed on the second portion of the customized housing and located at a position other than the second orifice.

According to some embodiments of the disclosure, the ventilation channel is a straight-through channel or a bent channel.

According to some embodiments of the disclosure, the ventilation rate adjusting device is configured to be manually operable to switch between a fully open state for fully opening the ventilation channel and a fully closed state for fully closing the ventilation channel.

According to some embodiments of the disclosure, the ventilation rate adjusting device is configured to be manually operable to be in a state of partially opening the ventilation channel.

According to some embodiments of the disclosure, the ventilation rate adjusting device is further configured to be manually operable to continuously adjust the ventilation rate of the ventilation channel.

According to some embodiments of the disclosure, the customized housing has an integral structure.

According to some embodiments of the disclosure, the ventilation rate adjusting device further comprises a movable portion and a fixed portion, and the movable portion is configured to be movable relative to the fixed portion to adjust the ventilation rate of the ventilation channel.

According to some embodiments of the disclosure, the ventilation rate adjusting device adopts a butterfly valve structure and comprises a valve plate as the movable portion, a valve body as the fixed portion, and a turning portion as the operating portion, the valve body comprises an opening communicated with the ventilation hole, the valve plate is disposed inside the valve body, and the ventilation rate adjusting device is configured to adjust the ventilation rate of the ventilation channel by means of the rotation of the valve plate in the valve body.

According to some embodiments of the disclosure, the turning portion comprises a convex turning feature protruding from the outer surface of the customized housing and having a three-pointed star shape, a triangularly-stacked shape, a three-strip shape, a concave strip shape or a striped shape.

According to some embodiments of the disclosure, the turning portion comprises a concave turning feature configured to be turned by an external turning member.

According to some embodiments of the disclosure, the valve plate and the turning portion are integrally formed.

According to some embodiments of the disclosure, the ventilation rate adjusting device further comprises a valve plate fixing member disposed outside the valve body, and the valve plate is disposed inside the valve body and comprises an extending portion configured to pass through a wall of the valve body to be fixedly connected to the valve plate fixing member.

According to some embodiments of the disclosure, the valve plate fixing member comprises an internal threaded hole, the extending portion comprises external threads, and the extending portion is configured to pass through the wall of the valve body to be threadedly engaged with the internal threaded hole of the valve plate fixing member.

According to some embodiments of the disclosure, the extending portion is fixedly connected to the valve plate fixing member by an adhesive.

According to some embodiments of the disclosure, the ventilation rate adjusting device further comprises a valve plate fixing member disposed outside the valve body, the valve plate is disposed inside the valve body and comprises an extending portion, the valve plate fixing member is a bolt pin, the extending portion comprises a hole, and the extending portion is configured to pass through a wall of the valve body so that the bolt pin can be inserted into the hole of the extending portion.

According to some embodiments of the disclosure, a rotation axis of the valve plate is substantially perpendicular to an extending direction of the ventilation hole at the ventilation rate adjusting device.

According to some embodiments of the disclosure, the ventilation rate adjusting device adopts a rotary-cover-with-opening structure and comprises a rotary cover as the movable portion, a base as the fixed portion and a turning portion as the operating portion, wherein the rotary cover comprises an opening, the base comprises an opening, and the ventilation rate adjusting device is configured to adjust the ventilation rate of the ventilation channel by the rotation of the rotary cover relative to the base.

According to some embodiments of the disclosure, the turning portion comprises a convex turning feature protruding from the outer surface of the customized housing and having a three-pointed star shape, a triangularly-stacked shape, a three-strip shape, a concave strip shape or a striped shape.

According to some embodiments of the disclosure, the turning portion comprises a concave turning feature configured to be turned by an external turning member.

According to some embodiments of the disclosure, the rotary cover and the turning portion are integrally formed.

According to some embodiments of the disclosure, the ventilation rate adjusting device further comprises a rotary cover fixing member and a pin disposed at one end of the base away from the turning portion, and the pin is configured to pass through the base to connect the rotary cover and the rotary cover fixing member in a non-rotatable way.

According to some embodiments of the disclosure, the pin is formed separately from the rotary cover, and the pin is formed separately from the rotary cover fixing member.

According to some embodiments of the disclosure, the pin is fixedly connected to the rotary cover and/or the rotary cover fixing member by an adhesive.

According to some embodiments of the disclosure, the pin is integrally formed with the rotary cover fixing member, the pin comprises external threads, and the rotary cover comprises an internal thread hole to be engaged with the external threads of the pin.

According to some embodiments of the disclosure, a rotation axis of the rotary cover is substantially parallel to an extending direction of the ventilation hole at the ventilation rate adjusting device.

According to some embodiments of the disclosure, the ventilation rate adjusting device adopts an one-way valve structure and comprises a valve core as the movable portion, a valve seat as the fixed portion and a press portion as the operating portion, the valve seat comprises a fluid channel communicated with the ventilation hole, and the ventilation rate adjusting device is configured to move the valve core relative to the valve seat when the press portion is pressed, so as to adjust the ventilation rate of the ventilation channel.

According to some embodiments of the disclosure, a moving direction of the valve core is substantially parallel or substantially perpendicular to an extending direction of the ventilation hole at the ventilation rate adjusting device.

According to some embodiments of the disclosure, the ventilation rate adjusting device further comprises a spring configured to apply an elastic force to the valve core, and the ventilation rate adjusting device is configured to resist the elastic force of the spring when the press portion is pressed, so as to move the valve core relative to the valve seat.

According to some embodiments of the disclosure, the ventilation rate adjusting device adopts an aperture structure and comprises a plurality of blades as the movable portion, a fixed seat as the fixed portion and a rotary ring as the operating portion, the fixed seat comprises a fluid channel communicated with the ventilation hole, and the ventilation rate adjusting device is configured to move the blades relative to the fixed seat when the rotary ring is rotated, so as to adjust the ventilation rate of the ventilation channel.

According to some embodiments of the disclosure, the blade comprises a first protrusion protruding from one surface and a second protrusion protruding from the other surface, the rotary ring comprises a driving groove for matching with the first protrusion, and the fixing seat comprises a sliding groove for matching with the second protrusion.

According to some embodiments of the disclosure, a rotation axis of the rotary ring is substantially parallel to an extending direction of the ventilation hole at the ventilation rate adjusting device.

According to some embodiments of the disclosure, the ventilation rate adjusting device adopts a plug structure and comprises a plug as both the movable portion and the operating portion and a mounting seat as the fixed portion, the mounting seat comprises a fluid channel communicated with the ventilation hole, and the ventilation rate adjusting device is configured to adjust the ventilation rate of the ventilation channel when the plug is pulled out of the mounting seat or when the plug is inserted into the mounting seat.

According to some embodiments of the disclosure, the plug comprises a fluid channel, and the fluid channel of the plug is in fluid communication with the fluid channel of the mounting seat when the plug is inserted into the mounting seat.

According to some embodiments of the disclosure, the mounting seat is integrally formed with the customized housing.

According to some embodiments of the disclosure, the ventilation rate adjusting device adopts a cover structure and comprises a cover as both the movable portion and the operating portion and an engagement seat as the fixed portion, the engagement seat comprises a fluid channel communicated with the ventilation hole, the cover is pivotally connected to the engagement seat, and the ventilation rate adjusting device is configured to adjust the ventilation rate of the ventilation channel when the cover is lifted up from the engagement seat or when the cover is put down on the engagement seat.

According to some embodiments of the disclosure, the cover and the engagement seat respectively comprise magnets causing the cover and the engagement seat to be attracted by each other when the cover is put down.

According to some embodiments of the disclosure, the in-ear wearable device is an in-ear wireless earphone.

According to the embodiments of the disclosure, the in-ear wearable device comprises the ventilation hole in which the ventilation rate adjusting device is disposed. By opening or closing the ventilation hole with the ventilation rate adjusting device, it is possible to switch between different use modes to overcome the ear occlusion effect, improve the wearing comfort for the user, and adapt to different use scenarios.

DETAILED DESCRIPTION OF THE EMBODIMENTS

Figure 1:
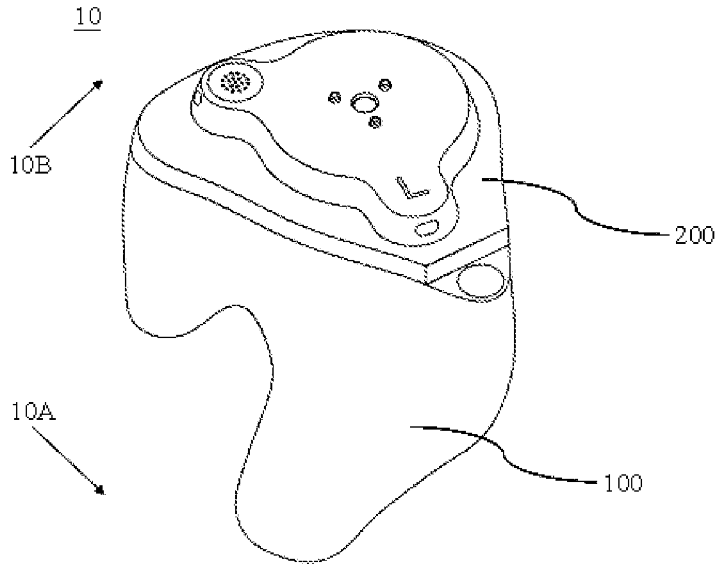
FIG. 1 shows a perspective view of an in-ear wireless earphone according to some embodiments of the disclosure.

Hereinafter, the embodiments of the disclosure are described with reference to the drawings. The following detailed description and drawings are used to illustrate the principles of the disclosure. The disclosure is not limited to the described preferred embodiments, and its scope is defined by the claims. The disclosure will now be described in detail with reference to the exemplary embodiments, some of which are illustrated in the drawings. The following description is made with reference to the drawings, wherein like reference numerals in different drawings represent the same or similar elements unless otherwise indicated. The solutions described in the following exemplary embodiments do not represent all the solutions of the disclosure. Rather, these solutions are merely examples of systems and methods of various aspects of the disclosure involved in the appended claims.

The disclosure provides an in-ear wearable device, which can provide a user with various functions, such as audio reproduction, sound reception, health monitoring, etc., by being inserted into the user's ear, especially an acoustic meatus of the user. The structure and the principle of the in-ear wearable device will be described in detail below by taking an in-ear wireless earphone as an example. But it shall be appreciated that the in-ear wearable device according to the disclosure is not limited to the in-ear wireless earphone. For example, in addition to the audio reproduction function, the in-ear wearable device may be additionally or alternatively implemented as having functions such as sound reception, temperature detection, blood pressure detection, heart rate detection, blood glucose detection, blood oxygen detection, etc. Furthermore, in some embodiments, the in-ear wearable device may not be implemented as an in-ear wireless earphone, that is, it only has other functions rather than the audio reproduction function.

FIG. 1 shows a perspective view of an in-ear wireless earphone 10 according to some embodiments of the disclosure. Only one earphone (for example, a left earphone) is shown in FIG. 1, but those skilled in the art shall appreciate that a pair of earphones is usually composed of a left earphone and a right earphone with substantially symmetrical structures. Thus, for simplicity, only one earphone is shown in the drawing, and the following description is given only for one earphone. The in-ear wireless earphone 10 includes a first side 10A and a second side 10B. The first side 10A of the in-ear wireless earphone 10 represents a side in the acoustic meatus of the user when the user wears the in-ear wireless earphone 10, and the second side 10B of the in-ear wireless earphone 10 represents a side exposed to an external environment when the user wears the in-ear wireless earphone 10. As shown in FIG. 1, the first side 10A of the in-ear wireless earphone 10 is located at its lower portion, and the second side 10B is located at its upper portion.

Figure 2:
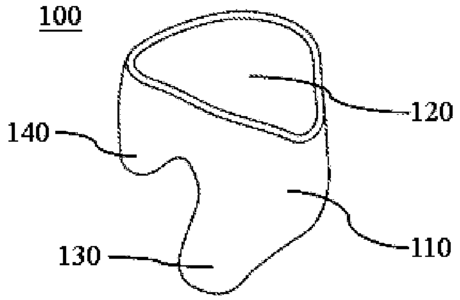
FIG. 2 shows a perspective view of a customized housing of an in-ear wireless earphone according to some embodiments of the disclosure.

Referring to FIG. 1, the in-ear wireless earphone 10 according to some embodiments of the disclosure includes a customized housing 100 and a panel 200. FIG. 2 shows a perspective view of a customized housing of an in-ear wireless earphone according to some embodiments of the disclosure. Herein, the term 'customized' means that the housings are designed and manufactured individually, rather than uniformly, for different users' ears. The customized housing 100 for example may be manufactured using a manufacturing device based on an ear mold taken from a user's ear. The customized housing 100 may be manufactured by 3D printing or any other manufacturing method. The size of the customized housing 100 may be the same as that of the taken ear mold, or slightly smaller than that of the taken ear mold to improve the wearing comfort for some sensitive users.

In a case where the user wears a standard earphone, the size of the standard earphone is fixed and shall be as small as possible to adapt to the sizes of most users' ears (e.g., auricular concha cavities). But in order to ensure the stable wearing without falling off, it is necessary to provide some protrusions so that the earphone can be firmly stuck on the ear. In this case, when the standard earphone is worn, some parts of the acoustic meatuses or auricles of most users will be compressed, thereby resulting in discomfort caused by long-term wearing. For example, many users will feel uncomfortable with their ears after wearing the standard earphone for 30 minutes or even less. However, in the disclosure, since the customized housing 100 of the in-ear wireless earphone 10 is customized for the user and substantially does not compress the user's ear, the in-ear wireless earphone 10 of the disclosure improves the wearing comfort compared with the standard earphone, so that the user can wear the earphone for a longer time such as several hours or more. Further, since the user can wear the earphone for a longer time, it is more possible for the user to apply the earphone in various scenarios. For example, in addition to the conventional audio and video services, the earphone can also be used to make voice or video calls, play games, and carry out various virtual reality activities.

In an exemplary embodiment, the customized housing 100 has an integral structure or is integrally formed, i.e., formed at one time based on the ear mold of the user. In other embodiments, the customized housing 100 may also be composed of a plurality of parts. For example, the customized housing 100 may include an inner core portion that is the same for all or most users and may be assembled with the panel 200, and a customized adaption portion formed based on the ear mold of the user. In a case where the customized housing 100 includes the inner core portion and the customized adaption portion, the production efficiency can be improved since components other than the customized adaption portion are the same for most users.

According to some embodiments of the disclosure, the customized housing 100 includes a first portion for being inserted into an acoustic meatus of a user and matching with the shape of the acoustic meatus, and a second portion for being exposed to the external environment when the first portion is inserted into the acoustic meatus. By 'customization', when the user wears the in-ear wireless earphone 10, the customized housing 100 at least partially fits the acoustic meatus of the user. Thus, the first portion of the customized housing 100 serves as a portion that fits the acoustic meatus of the user, i.e., a portion isolated from the external environment, so as to provide a sealed listening environment in the acoustic meatus when the user wears the in-ear wireless earphone 10. In addition, the second portion of the customized housing 100 serves as a portion exposed to the external environment when the user wears the in-ear wireless earphone 10, so as to provide an operation space for a ventilation rate adjusting device (described in detail below). In some embodiments, the second portion of the customized housing 100 includes an open end located on a side of the second portion away from the first portion. In some embodiments, the panel 200 is mounted to the customized housing 100 at the open end of the second portion of the customized housing 100. For example, other components of the in-ear wireless earphone 10 may be arranged in the customized housing 100 through the open end, and then the panel 200 may be mounted to the open end.

According to some embodiments of the disclosure, the customized housing 100 includes a housing wall 110 and an inner cavity 120 surrounded by the housing wall 110. In some embodiments, the in-ear wireless earphone 10 may further include components such as a mainboard, a manipulation device, a charging device, a battery, an antenna device, a magnet, a sound pickup device, a speaker assembly and a wireless communication module. The components may be assembled together by means of bolts, welding, gluing, clamping, or the like. These components may be disposed in a space enclosed by the customized housing 100 and the panel 200. Specifically, these components may be mainly located in the inner cavity 120 of the customized housing 100, and the panel 200 may be used to enclose the inner cavity 120. The panel 200 may be a flat cover plate or any rugged or uneven cover plate as long as other components can work normally. In an exemplary embodiment, the panel 200 is mounted to the customized housing 100 on the second side 10B of the in-ear wireless earphone 10.

In some embodiments, as shown in FIG. 2, the customized housing 100 may include a first protruding portion 130 and a second protruding portion 140. When the user wears the in-ear wireless earphone 10, the first protruding portion 130 may be located in an auricular concha cavity of the user or both the auricular concha cavity and the external acoustic meatus of the user, and the second protruding portion 140 may be located in a cymba conchae of the user. The first protruding portion 130 may include an opening, and the speaker assembly is located in the first protruding portion 130 close to the opening. Thus, the sound output by a sound output device of the speaker assembly enters the acoustic meatus of the user through the opening.

Figure 3:
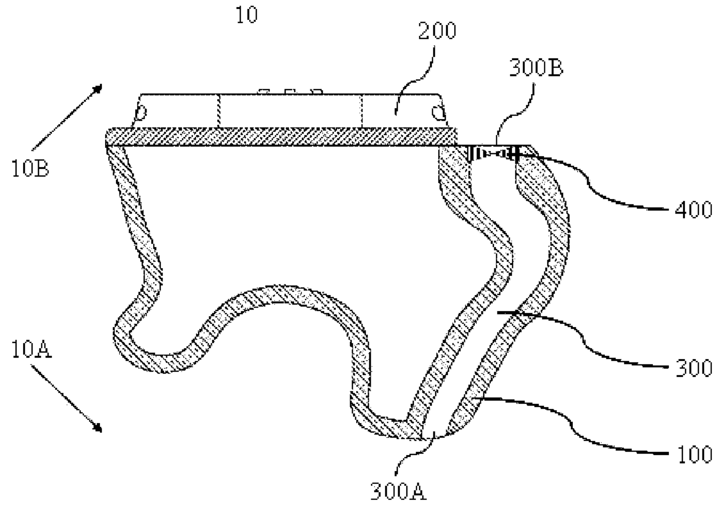
FIG. 3 shows a cross-sectional view of an in-ear wireless earphone according to some embodiments of the disclosure.

FIG. 3 shows a cross-sectional view of an in-ear wireless earphone according to some embodiments of the disclosure. According to some embodiments of the disclosure, the in-ear wireless earphone includes a ventilation hole 300 and a ventilation rate adjusting device 400. The ventilation hole 300 is at least partially disposed in the customized housing 100, i.e., at least partially formed by the customized housing 100. In some embodiments, a section of the ventilation hole 300 disposed in the customized housing 100 is formed in the housing wall 110. For example, the section of the ventilation hole 300 disposed in the customized housing 100 may be formed along with the manufacturing of the customized housing 100, or may be additionally formed in the housing wall 110 after the customized housing 100 is manufactured. In some embodiments, the ventilation hole has a diameter of 0.8 to 3.0 mm, such as 2.0 mm. According to some embodiments of the disclosure, as shown in FIG. 3, the ventilation hole 300 is completely disposed in the customized housing 100. In an exemplary embodiment, the ventilation hole 300 is completely disposed in the housing wall 110 of the customized housing 100. The ventilation hole 300 includes a first orifice 300A for being exposed to the acoustic meatus of the user and a second orifice 300B for being exposed to the external environment when the user wears the in-ear wireless earphone 10. Thus, the first orifice 300A is located on the first side 10A of the in-ear wireless earphone 10, and the second orifice 300B is located on the second side 10B of the in-ear wireless earphone 10. In some embodiments, the ventilation hole 300 is a straight-through ventilation hole. In some embodiments, ventilation hole 300 is a bent ventilation hole. Compared with the straight-through ventilation hole, the bent ventilation hole can provide a longer ventilation hole length in a relatively small volume, thereby being more suitable for the in-ear wireless earphone 10 or the customized housing 100 with a small volume.

According to some embodiments of the disclosure, the ventilation rate adjusting device 400 is mounted in the ventilation hole 300. The ventilation hole 300 and the ventilation rate adjusting device 400 constitute at least a part of a ventilation channel which is isolated from the inner cavity 120 of the customized housing 100. The term 'isolated' means that when the user wears the in-ear wireless earphone 10 (i.e., when the first portion of the customized housing 100 is inserted into the acoustic meatus of the user), the ventilation channel is not in fluid communication with the inner cavity 120 of the customized housing 100. The ventilation channel is configured to fluidly connect the acoustic meatus of the user to the external environment when the user wears the in-ear wireless earphone 10. Thus, the ventilation channel is configured to fluidly connect the first side 10A and the second side 10B of the in-ear wireless earphone. By isolating the ventilation channel from the inner cavity 120 of the customized housing 100, the influence of a ventilation airflow on the internal components and the sound quality of the in-ear wireless earphone can be avoided or reduced in a ventilation process of the ventilation channel, and the applicability and stability of the in-ear wireless earphone in different modes can be improved.

In some embodiments, the ventilation rate adjusting device 400 is disposed at the second orifice 300B of the ventilation hole 300, i.e., at an end of the ventilation hole 300 on the second side 10B. In some embodiments, the ventilation rate adjusting device 400 is disposed in the ventilation hole 300 at a position spaced apart from both the first orifice 300A and the second orifice 300B, i.e., at a middle position of the ventilation hole 300.

According to some embodiments of the disclosure, the ventilation channel is at least partially disposed in the customized housing 100. In some embodiments, the ventilation channel is completely disposed in the customized housing 100. In some embodiments, the ventilation channel is a straight-through channel. In some embodiments, the ventilation channel is a bent channel. The bent channel is suitable to be arranged in a smaller housing and in-ear wireless earphone to achieve a ventilation channel of the same length or longer than the pass-through channel.

According to some embodiments of the disclosure, the ventilation rate adjusting device 400 is configured to be manually operable to adjust a ventilation rate of the ventilation channel. The term 'manually operable' herein means the operation is conducted only by a force exerted by the user's hand without any electrical power. Specifically, the ventilation rate adjusting device 400 may be manually operated to open and close the ventilation hole 300, thereby opening and closing the ventilation channel. Therefore, the ventilation channel may perform a ventilation when being opened by the ventilation rate adjusting device 400, and may provide a better listening effect when being closed by the ventilation rate adjusting device 400.

When the user wears the in-ear wireless earphone with the customized housing, the acoustic meatus is sealed by the customized housing in a case where the ventilation hole is closed, so that the user can have, such as, a better music listening effect. However, in a case where the ventilation hole is closed, the acoustic meatus is sealed by the customized housing, resulting in different air pressures inside and outside the acoustic meatus due to the ear occlusion effect, which causes uncomfortable long-term wearing or unnatural listening for the user. By opening or closing the ventilation hole 300 through the ventilation rate adjusting device 400, it is possible to switch between different use modes to overcome the ear occlusion effect, improve the wearing comfort for the user, and adapt to different use scenarios.

According to some embodiments of the disclosure, the ventilation rate adjusting device 400 may be manually operated to be switched between a fully open state for fully opening (100%) the ventilation channel and a fully closed state for fully closing (0%) the ventilation channel. In the fully open state, the ventilation channel is in a maximum open state, so that a maximum ventilation rate can be achieved. In the fully closed state, the ventilation channel is in the fully closed state, so that no ventilation can be achieved.

In some embodiments, in addition to the fully open state and the fully closed state described above, the ventilation rate adjusting device 400 may be manually operated in one or more partially open states for partially opening the ventilation channel. Thus, the ventilation rate adjusting device 400 may have multiple levels of ventilation rates. For example, the ventilation rate adjusting device 400 may be manually operated to be in a 25% open state, a 50% open state, a 75% open state, and the like.

In some embodiments, the ventilation rate adjusting device 400 may also be manually operated to continuously adjust a ventilation rate of the ventilation channel. Therefore, the ventilation rate adjusting device 400 can be in a stepless adjustment.

In some embodiments, the ventilation rate adjusting device 400 is configured to adjust the ventilation rate of the ventilation channel so as to adjust audio characteristics of the in-ear wireless earphone 10. Thus, the ventilation rate adjusting device 400 can adjust the ventilation rate of the ventilation channel, i.e., an opening degree of the ventilation hole. When the ventilation channel of the in-ear wireless earphone 10 is fully closed, the in-ear wireless earphone 10 can have better noise reduction effect and audio listening experience. When the ventilation rate adjusting device 400 is operated by the user to open the ventilation channel of the in-ear wireless earphone 10, the ventilation channel can achieve a ventilation, so that the user can receive the sound of the external environment more clearly, which avoids the sound occlusion effect, and improves the wearing comfort. In addition, when the ventilation rate adjusting device 400 is operated by the user to make the ventilation channel have different ventilation rates, the in-ear wireless earphone 10 will have different audio characteristics, so that the user can conveniently adjust his/her listening experience to meet different requirements.

In some embodiments, the mounting position of the ventilation rate adjusting device 400 may be set at the first orifice 300A or the second orifice 300B of the ventilation hole 300. In some embodiments, the mounting position of the ventilation rate adjusting device 400 is set at a position in the ventilation hole 300 spaced apart from both the first orifice 300A and the second orifice 300B, i.e., at a middle position of the ventilation hole 300. By mounting the ventilation rate adjusting device 400 at different positions in the ventilation hole, different in-ear wireless earphones 10 can have different audio cavities, so that different audio effects can be defined to meet personalized requirements.

According to some embodiments of the disclosure, the ventilation rate adjusting device 400 includes an operating portion located on the second portion of the customized housing 100 and exposed from an outer surface of the customized housing 100. The user may manually operate the operating portion of the ventilation rate adjusting device 400 to adjust the ventilation rate of the ventilation channel. By exposing the operating portion of the ventilation rate adjusting device 400 to the external environment when the user wears the in-ear wireless earphone 10, the user can directly operate the ventilation rate adjusting device 400 to adjust the ventilation rate of the ventilation channel without taking off the in-ear wireless earphone 10. Therefore, it is more convenient for the user to operate and improve the use experience thereof.

In some embodiments, the operating portion of the ventilation rate adjusting device 400 is disposed at the second orifice 300B of the ventilation hole 300. By disposing the operating portion at the second orifice (outlet) of the ventilation hole 300, the space occupied by the ventilation rate adjusting device 400 on an outer surface of the in-ear wireless earphone 10 can be reduced, which is beneficial to realize a more compact structure and reduce the manufacturing and assembly costs of the in-ear wireless earphone 10. In some embodiments, the operating portion of the ventilation rate adjusting device 400 is disposed on the second portion of the customized housing 100 and located at a position other than the second orifice 300B. Thus, the operating portion of the ventilation rate adjusting device 400 is not located at the second orifice 300B. By disposing the operating portion and the second orifice of the ventilation hole 300 separately, the influence of the user's operation on the airflow at the second orifice can be reduced, so that the user can more accurately perceive the influence of the adjustment by the ventilation rate adjusting device 400 on the audio characteristics.

According to some embodiments of the disclosure, the ventilation rate adjusting device 400 further includes a movable portion and a fixed portion, wherein the movable portion is movable relative to the fixed portion to adjust the ventilation rate of the ventilation channel. Hereinafter, a ventilation rate adjusting device according to some embodiments of the disclosure will be described in detail with reference to the drawings.

Butterfly Valve Structure

Figure 4A:
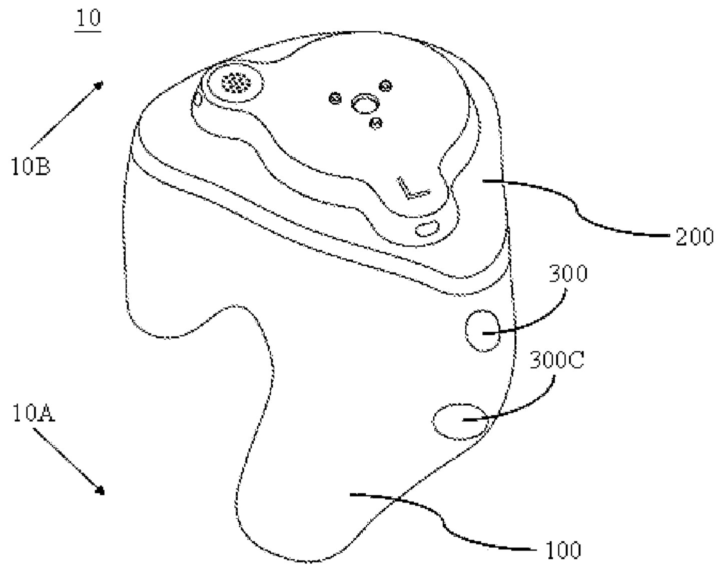
FIG. 4A shows a perspective view of an in-ear wireless earphone according to some embodiments of the disclosure.
Figure 4B:
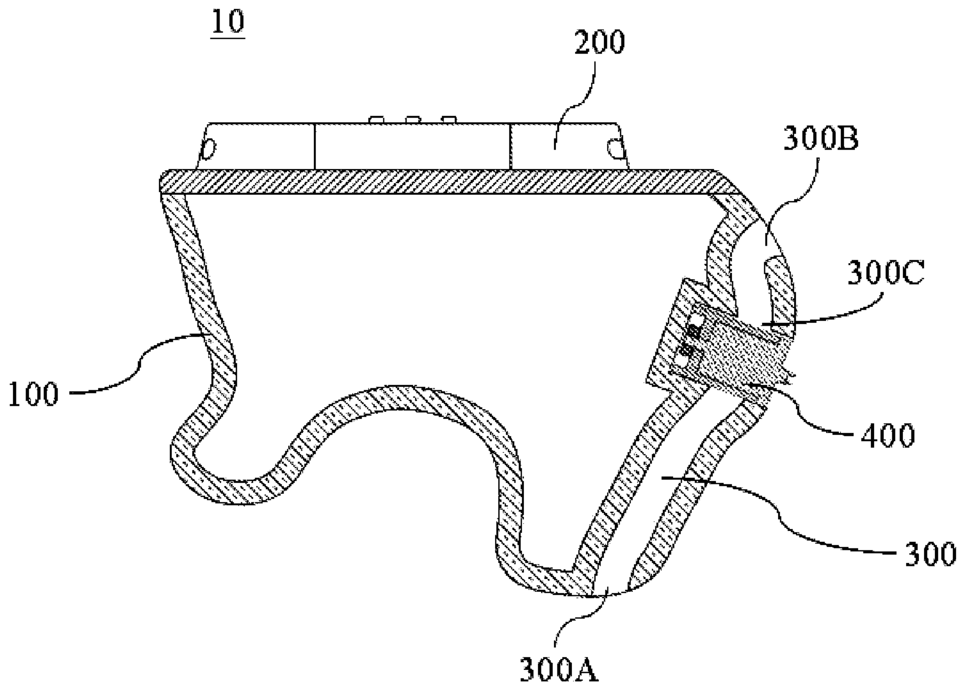
FIG. 4B shows a cross-sectional view of an in-ear wireless earphone according to some embodiments of the disclosure.
Figure 4C:
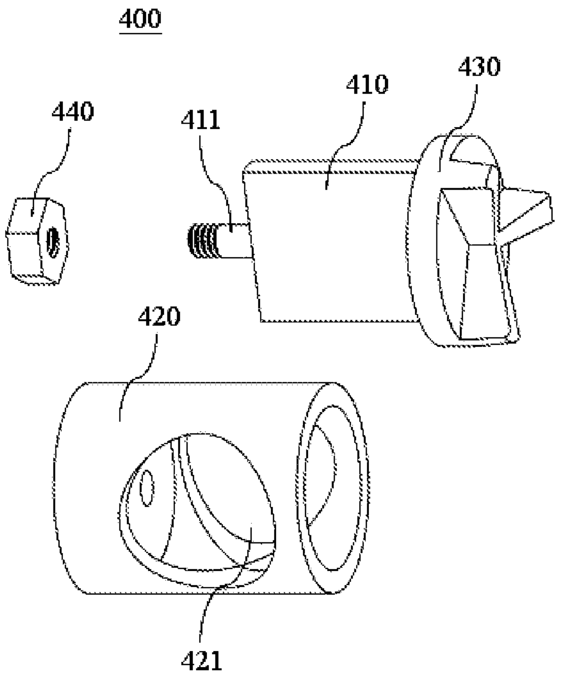
FIG. 4C shows an exploded view of a ventilation rate adjusting device of an in-ear wireless earphone according to some embodiments of the disclosure.
Figure 4D:
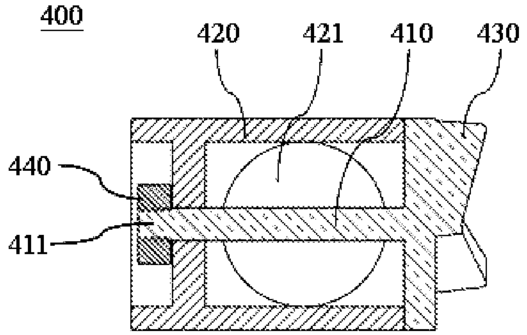
FIG. 4D shows a cross-sectional view of a ventilation rate adjusting device in an open state according to some embodiments of the disclosure.
Figure 4E:
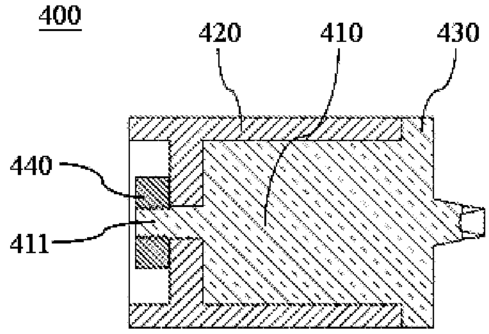
FIG. 4E shows a cross-sectional view of a ventilation rate adjusting device in a closed state according to some embodiments of the disclosure.

According to some embodiments of the disclosure, the ventilation rate adjusting device may adopt a butterfly valve structure. FIG. 4A shows a perspective view of an in-ear wireless earphone according to some embodiments of the disclosure. FIG. 4B shows a cross-sectional view of an in-ear wireless earphone according to some embodiments of the disclosure. FIG. 4C shows an exploded view of a ventilation rate adjusting device of an in-ear wireless earphone according to some embodiments of the disclosure. FIG. 4D shows a cross-sectional view of a ventilation rate adjusting device in an open state according to some embodiments of the disclosure. FIG. 4E shows a cross-sectional view of a ventilation rate adjusting device in a closed state according to some embodiments of the disclosure.

As shown in FIG. 4A, the in-ear wireless earphone 10 includes a customized housing 100, a panel 200 and a ventilation hole 300. As shown in FIG. 4B, the ventilation hole 300 of the in-ear wireless earphone 10 is disposed in the customized housing 100 and includes a mounting position 300C (not shown in FIG. 4A) for mounting the ventilation rate adjusting device 400. In an exemplary embodiment, as shown in FIG. 4B, the mounting position 300C is set in the ventilation hole 300 at a position spaced apart from both a first orifice 300A and a second orifice 300B, i.e., at a middle position of the ventilation hole 300. In some embodiments, the mounting position 300C may be set at the second orifice 300B of the ventilation hole 300. Please refer to the foregoing descriptions for other components and structures of the in-ear wireless earphone 10, which will not be repeated here.

In some embodiments, an extending direction of the ventilation hole 300 at the mounting position 300C is substantially straight. For example, the ventilation hole 300 is a straight-through ventilation hole, or the ventilation hole 300 has a straight-through section at the mounting position 300C although it is a bent ventilation hole as a whole.

According to some embodiments of the disclosure, as shown in FIGS. 4C to 4E, the ventilation rate adjusting device 400 includes a valve plate 410 as the movable portion, a valve body 420 as the fixed portion, and a turning portion 430 as the operating portion. The valve body 420 includes an opening 421 communicated with the ventilation hole 300. The valve plate 410 is disposed inside the valve body 420. The valve plate 410 is rotatable relative to the valve body 420. In an exemplary embodiment, a rotation axis of the valve plate 410 is intersected with, e.g., substantially perpendicular to, the extending direction of the ventilation hole 300 at the ventilation rate adjusting device 400. Herein 'the extending direction of the ventilation hole 300 at the ventilation rate adjusting device 400' means an extending direction of the ventilation hole 300 at the mounting position 300C, i.e., a center line of the ventilation hole 300 at the mounting position 300C. In an exemplary embodiment, the turning portion 430 is disposed on the second portion of the customized housing 100 and located at a position other than the second orifice 300B.

In an exemplary embodiment, the ventilation rate adjusting device 400 further includes a valve plate fixing member 440 disposed outside the valve body 420, and the valve plate 410 includes an extending portion 411. The extending portion 411 passes through a wall of the valve body 420 to be fixedly connected to the valve plate fixing member 440. In some embodiments, as shown in FIGS. 4B to 4E, the valve plate fixing member 440 includes an internal threaded hole, the extending portion 411 includes external threads, and the extending portion 411 passes through the wall of the valve body 420 to be threadedly engaged with the internal threaded hole of the valve plate fixing member 440.

According to some embodiments of the disclosure, the turning portion 430 and the valve plate 410 are connected with each other in a non-rotatable way. In some embodiments, as shown in FIGS. 4C to 4E, the valve plate 410 and the turning portion 430 are integrally formed. However, the disclosure is not limited thereto. In some embodiments, the valve plate 410 and the turning portion 430 may be formed separately and connected together. For example, the valve plate 410 and the turning portion 430 may be connected to each other by an adhesive, threads, or the like.

According to some embodiments of the disclosure, the ventilation rate adjusting device 400 may adjust the ventilation rate of the ventilation channel through the rotation of the valve plate 410. Specifically, the user manually turns the turning portion 430 to rotate the valve plate 410 relative to the valve body 420, thereby opening or closing the ventilation channel or adjusting the opening degree thereof.

As described above, the valve plate 410 and the valve plate fix 440 are engaged with each other by threads. However, the disclosure is not limited thereto. Hereinafter, other connection modes for the extending portion 411 and the valve plate fixing member 440 of the ventilation rate adjusting device will be described with reference to the drawings.

Figure 5A:
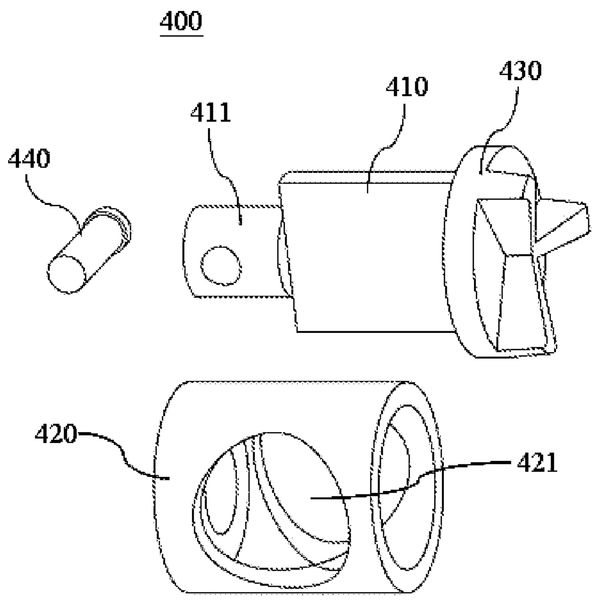
FIG. 5A shows an exploded view of a ventilation rate adjusting device of an in-ear wireless earphone according to some embodiments of the disclosure.
Figure 5B:
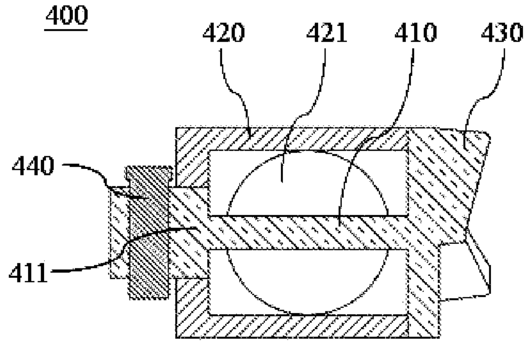
FIG. 5B shows a cross-sectional view of a ventilation rate adjusting device in an open state according to some embodiments of the disclosure.
Figure 5C:
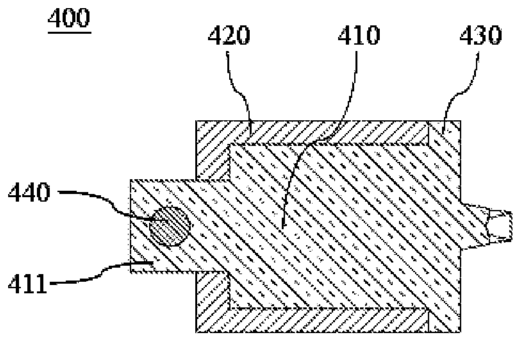
FIG. 5C shows a cross-sectional view of a ventilation rate adjusting device in a closed state according to some embodiments of the disclosure.

FIG. 5A shows an exploded view of a ventilation rate adjusting device of an in-ear wireless earphone according to some embodiments of the disclosure. FIG. 5B shows a cross-sectional view of a ventilation rate adjusting device in an open state according to some embodiments of the disclosure. FIG. 5C shows a cross-sectional view of a ventilation rate adjusting device in a closed state according to some embodiments of the disclosure. In some embodiments, as shown in FIGS. 5A to 5C, the valve plate fixing member 440 of the ventilation rate adjusting device 400 is a bolt pin, and the extending portion 411 of the valve plate 410 includes a hole. The extending portion 411 may pass through the wall of the valve body 420, and the valve plate fixing member 440 serving as the bolt pin may be inserted into the hole of the extending portion 411 to fix and restrain the valve plate 410. In some embodiments, the bolt pin may also be fixed into the hole of the extending portion 411 by an adhesive or the like. In the embodiments shown in FIGS. 5A to 5C, please refer to the foregoing descriptions for other structures of the ventilation rate adjusting device 400, which will not be repeated here.

Figure 6A:
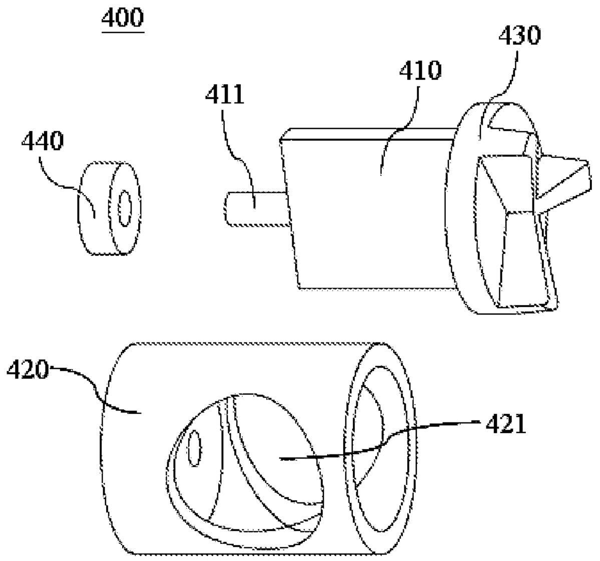
FIG. 6A shows an exploded view of a ventilation rate adjusting device of an in-ear wireless earphone according to some embodiments of the disclosure.
Figure 6B:
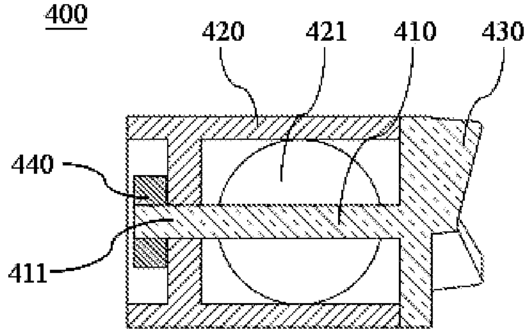
FIG. 6B shows a cross-sectional view of a ventilation rate adjusting device in an open state according to some embodiments of the disclosure.
Figure 6C:
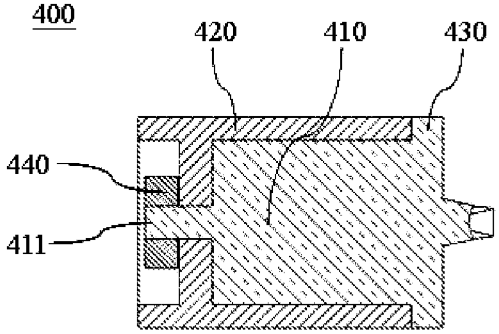
FIG. 6C shows a cross-sectional view of a ventilation rate adjusting device in a closed state according to some embodiments of the disclosure.

FIG. 6A shows an exploded view of a ventilation rate adjusting device of an in-ear wireless earphone according to some embodiments of the disclosure. FIG. 6B shows a cross-sectional view of a ventilation rate adjusting device in an open state according to some embodiments of the disclosure. FIG. 6C shows a cross-sectional view of a ventilation rate adjusting device in a closed state according to some embodiments of the disclosure. In some embodiments, as shown in FIGS. 6A to 6C, the valve plate fixing member 440 of the ventilation rate adjusting device 400 includes a hole, and the extending portion 411 of the valve plate 410 may pass through the wall of the valve body 420 and be connected into the hole of the valve plate fixing member 440, so as to fix and restrain the valve plate 410. In some embodiments, the extending portion 411 may be fixed into the hole of the valve plate fixing member 440 by an adhesive or the like. In the embodiments shown in FIGS. 6A to 6C, please refer to the foregoing description for other structures of the ventilation rate adjusting device 400, which will not be repeated here.

Figure 7A:
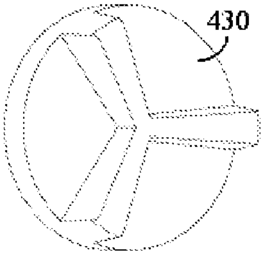
FIGS. 7A to 7E show perspective views of a turning portion according to some embodiments of the disclosure.
Figure 7B:
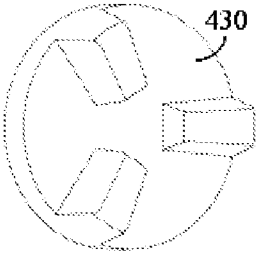
Figure 7C:
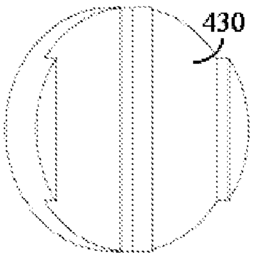
Figure 7D:
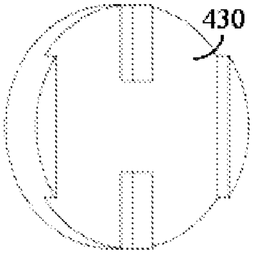
Figure 7E:
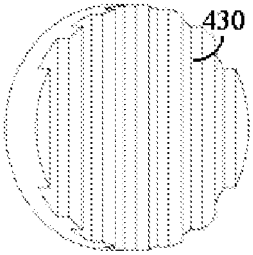

In some embodiment, the turning portion 430 includes a convex turning feature which may be designed to facilitate a touch by the user's hand for a turning operation. When the ventilation rate adjusting device 400 is mounted in the customized housing 100, the convex turning feature of the turning portion 430 may protrude from the outer surface of the customized housing 100 so as to be directly operated by the user's finger. FIGS. 7A to 7E show perspective views of a turning portion according to some embodiments of the disclosure. In some embodiments, as shown in FIGS. 4C and 7A, the convex turning feature of the turning portion 430 has a three-pointed star shape. However, the disclosure is not limited thereto. In some embodiments, as shown in FIGS. 7B to 7E, the convex turning feature of the turning portion 430 may also have a shape such as a triangularly-stacked shape, a three-strip shape, a concave strip shape or a striped shape, as long as it can be directly operated by the finger.

As described above, the turning portion 430 has a convex turning feature convenient to be directly operated by the finger. However, the disclosure is not limited thereto. Hereinafter, the turning portion and other structures of the ventilation rate adjusting device will be described with reference to the drawings.

Figure 8A:
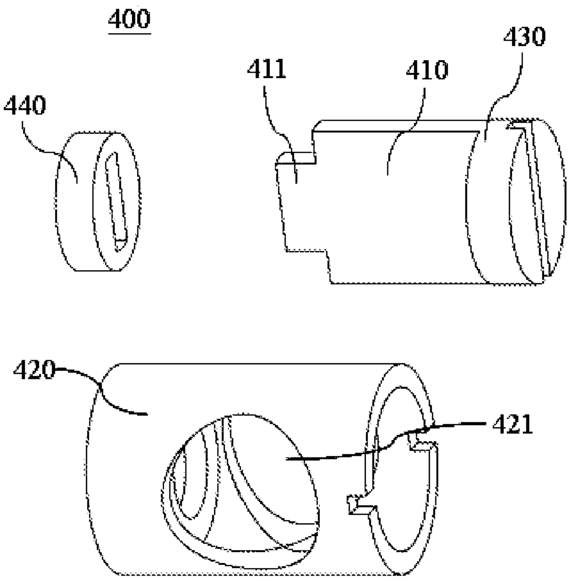
FIG. 8A shows an exploded view of a ventilation rate adjusting device of an in-ear wireless earphone according to some embodiments of the disclosure.
Figure 8B:
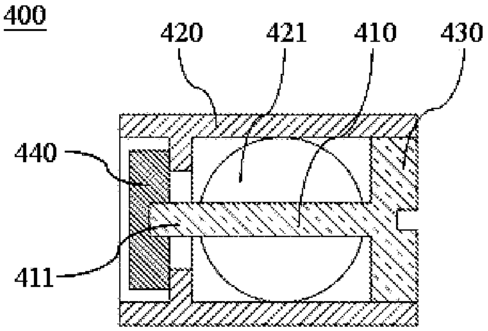
FIG. 8B shows a cross-sectional view of a ventilation rate adjusting device in an open state according to some embodiments of the disclosure.
Figure 8C:
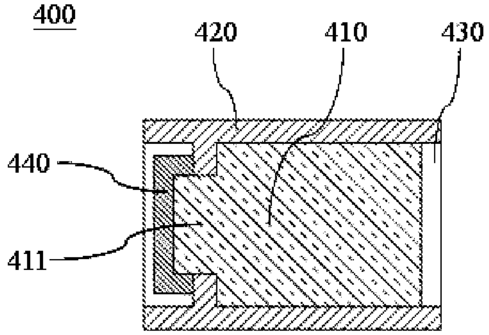
FIG. 8C shows a cross-sectional view of a ventilation rate adjusting device in a closed state according to some embodiments of the disclosure.

FIG. 8A shows an exploded view of a ventilation rate adjusting device of an in-ear wireless earphone according to some embodiments of the disclosure. FIG. 8B shows a cross-sectional view of a ventilation rate adjusting device in an open state according to some embodiments of the disclosure. FIG. 8C shows a cross-sectional view of a ventilation rate adjusting device in a closed state according to some embodiments of the disclosure. In some embodiments, as shown in FIGS. 8A to 8C, the turning portion 430 includes a concave turning feature. In some embodiments, when the ventilation rate adjusting device 400 is mounted in the customized housing 100, the concave turning feature of the turning portion 430 does not protrude from the outer surface of the customized housing 100, and needs to be turned by an external turning member (e.g., a dedicated rotation driving rod). In the embodiments shown in FIGS. 8A to 8C, please refer to the foregoing descriptions for other structures of the ventilation rate adjusting device 400, which will not be repeated here.

Figure 9A:
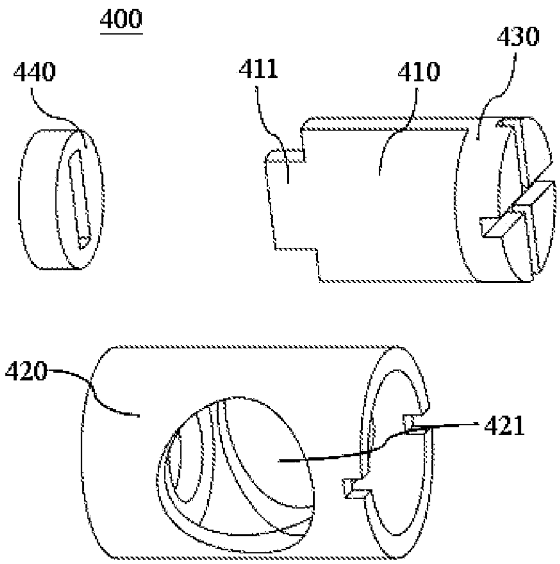
FIG. 9A shows an exploded view of a ventilation rate adjusting device of an in-ear wireless earphone according to some embodiments of the disclosure.
Figure 9B:
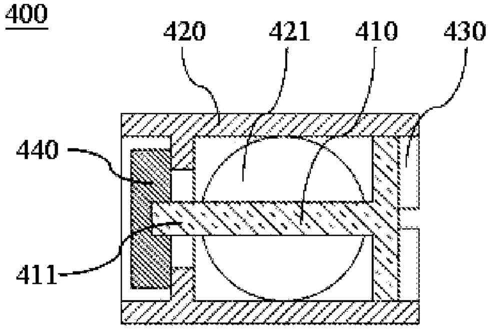
FIG. 9B shows a cross-sectional view of a ventilation rate adjusting device in an open state according to some embodiments of the disclosure.
Figure 9C:
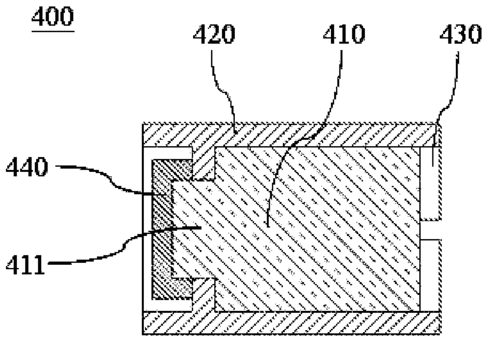
FIG. 9C shows a cross-sectional view of a ventilation rate adjusting device in a closed state according to some embodiments of the disclosure.

In some embodiments, as shown in FIG. 8A, the concave turning feature of the turning portion 430 has a slot shape. However, the disclosure is not limited thereto. FIG. 9A shows an exploded view of a ventilation rate adjusting device of an in-ear wireless earphone according to some embodiments of the disclosure. FIG. 9B shows a cross-sectional view of a ventilation rate adjusting device in an open state according to some embodiments of the disclosure. FIG. 9C shows a cross-sectional view of a ventilation rate adjusting device in a closed state according to some embodiments of the disclosure. In some embodiments, as shown in FIGS. 9A to 9C, the concave turning feature of the turning portion 430 may also have a cross shape or the like, as long as it can be operated by an external turning member. In the embodiments shown in FIGS. 9A to 9C, please refer to the foregoing descriptions for other structures of the ventilation rate adjusting device 400, which will not be repeated here.

Rotary-Cover-With-Opening Structure

Figure 10A:
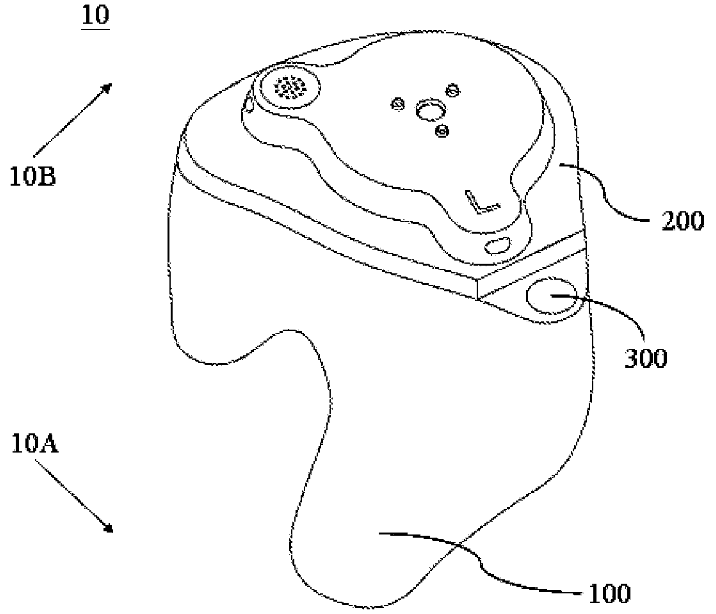
FIG. 10A shows a perspective view of an in-ear wireless earphone according to some embodiments of the disclosure.
Figure 10B:
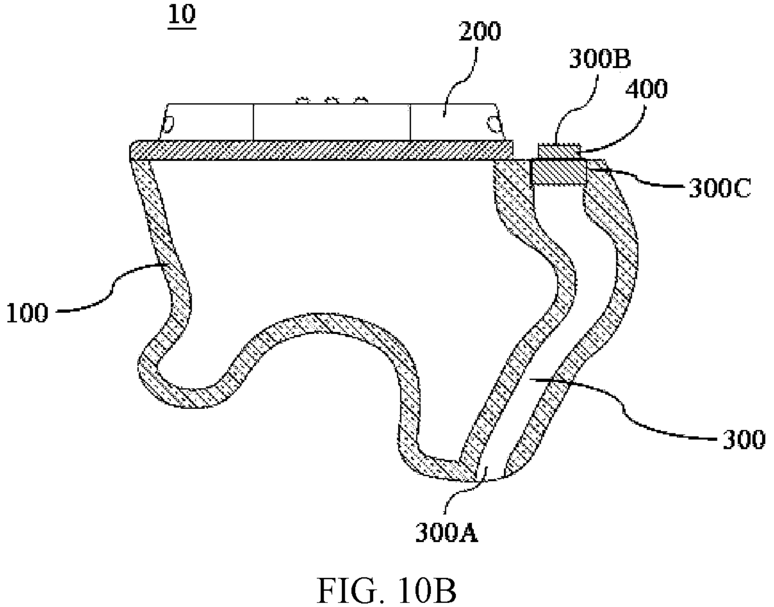
FIG. 10B shows a cross-sectional view of an in-ear wireless earphone according to some embodiments of the disclosure.
Figure 10C:
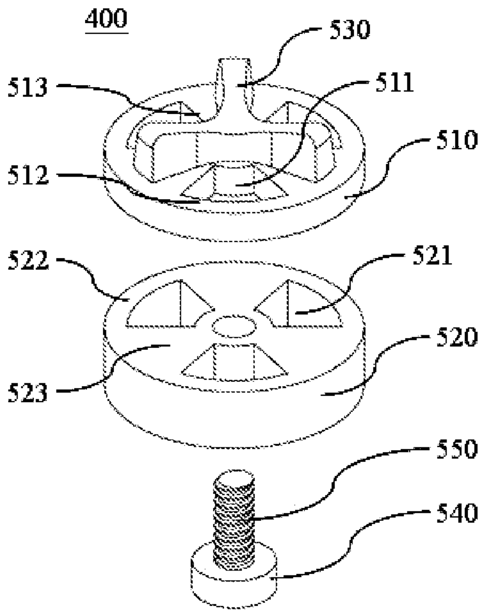
FIG. 10C shows an exploded view of a ventilation rate adjusting device of an in-ear wireless earphone according to some embodiments of the disclosure.
Figure 10D:
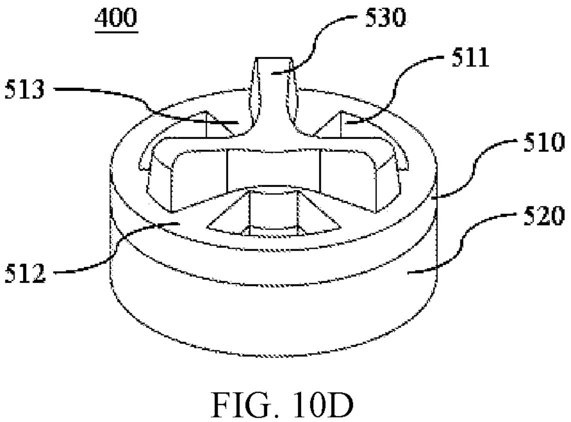
FIG. 10D shows a schematic view of a ventilation rate adjusting device in an open state according to some embodiments of the disclosure.
Figure 10E:
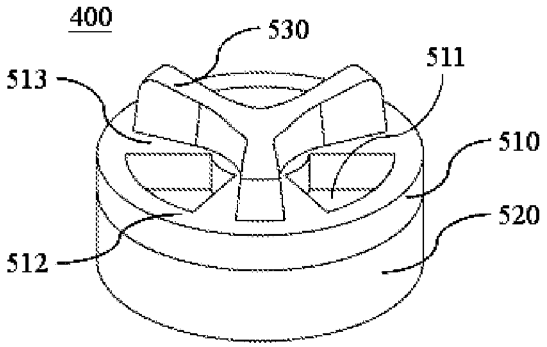
FIG. 10E shows a schematic view of a ventilation rate adjusting device in a closed state according to some embodiments of the disclosure.

According to some embodiments of the disclosure, the ventilation rate adjusting device may adopt a rotary-cover-with-opening structure. FIG. 10A shows a perspective view of an in-ear wireless earphone according to some embodiments of the disclosure. FIG. 10B shows a cross-sectional view of an in-ear wireless earphone according to some embodiments of the disclosure. FIG. 10C shows an exploded view of a ventilation rate adjusting device of an in-ear wireless earphone according to some embodiments of the disclosure. FIG. 10D shows a schematic view of a ventilation rate adjusting device in an open state according to some embodiments of the disclosure. FIG. 10E shows a schematic view of a ventilation rate adjusting device in a closed state according to some embodiments of the disclosure.

As shown in FIG. 10A, the in-ear wireless earphone 10 includes a customized housing 100, a panel 200 and a ventilation hole 300. As shown in FIG. 10B, the ventilation hole 300 of the in-ear wireless earphone 10 is disposed in the customized housing 100, and includes a mounting position 300C for mounting a ventilation rate adjusting device 400. In an exemplary embodiment, as shown in FIG. 10B, the mounting position 300C is set at a second orifice 300B of the ventilation hole 300. In the embodiments shown in FIGS. 10A to 10E, please refer to the foregoing descriptions for other components and structures of the in-ear wireless earphone 10, which will not be repeated here.

According to some embodiments of the disclosure, as shown in FIGS. 10C to 10E, the ventilation rate adjusting device 400 includes a rotary cover 510 as the movable portion, a base 520 as the fixed portion, and a turning portion 530 as the operating portion. The rotary cover 510 includes an opening 511, and the base 520 includes an opening 521. The rotary cover 510 is rotatable relative to the base 520. By the rotation of the rotary cover 510 relative to the base 520, the opening 511 of the rotary cover 510 and the opening 521 of the base 520 can be communicated with each other and with the ventilation hole 300, thereby achieving the ventilation of the ventilation channel. In an exemplary embodiment, as shown in FIGS. 10C to 10E, the turning portion 530 is disposed to at least partially overlap the rotary cover 510 in an axial direction of the rotary cover 510, i.e., the turning portion 530 protrudes from an upper surface of the rotary cover 510. In an exemplary embodiment, the turning portion 530 is disposed at the second orifice 300B of the ventilation hole 300.

In some embodiments, as shown in FIGS. 10C to 10E, the rotary cover 510 is disposed to at least partially overlap the base 520 along a rotation axis of the rotary cover 510. In some embodiments, the rotary cover 510 is disposed closer to the second orifice 300B of the ventilation hole 300 relative to the base 520, i.e., the rotary cover 510 is closer to the external environment when the user wears the in-ear wireless earphone 10. However, the disclosure is not limited thereto. In other embodiments, the rotary cover 510 is disposed farther away from the second orifice 300B of the ventilation hole 300 relative to the base 520, i.e., the rotary cover 510 is closer to an acoustic meatus of the user when the user wears the in-ear wireless earphone 10.

In an exemplary embodiment, the rotation axis of the rotary cover 510 is substantially parallel to an extending direction of the ventilation hole 300 at the ventilation rate adjusting device 400. However, the disclosure is not limited thereto. In some embodiments, the rotation axis of the rotary cover 510 is intersected with, e.g., substantially perpendicular to, the extending direction of the ventilation hole 300 at the ventilation rate adjusting device 400. In this case, the ventilation rate adjusting device 400 can be more conveniently disposed at the middle position of the ventilation hole 300.

In some embodiments, as shown in FIGS. 10C to 10E, the rotary cover 510 includes an annular portion 512 and connecting portions 513 arranged in the annular portion 512. The opening 511 of the rotary cover 510 is formed by being surrounded by the annular portion 512 and the connecting portions 513. In addition, the base 520 includes an annular portion 522 and connecting portions 523 arranged in the annular portion 522. The opening 521 of the base 520 is formed by being surrounded by the annular portion 522 and the connecting portions 523. The rotary cover 510 and the base 520 are disposed in the ventilation hole 300 through the annular portions 512 and 522, respectively. It shall be appreciated that the numbers of the openings and the connecting portions of the rotary cover and the base are not particularly limited in the disclosure.

In some embodiments, as shown in FIG. 10C, the ventilation rate adjusting device 400 further includes a rotary cover fixing member 540 and a pin 550 disposed at an end of the base 520 away from the turning portion 530. The base 520 includes a through-hole. The pin 550 passes through the base 520 to connect the rotary cover 510 and the rotary cover fixing member 540 to fix and restrain the rotary cover 510. In an exemplary embodiment, the pin 550 is fixedly connected to the rotary cover fixing member 540. In some embodiments, the pin 550 includes external threads (as shown in FIG. 10C), and the rotary cover 510 includes an internal thread hole (not shown), and the pin 550 passes through the base 520 to be threadedly engaged with the internal thread hole of the rotary cover 510, thereby connecting the rotary cover 510 and the rotary cover fixing member 540 to each other.

According to some embodiments of the disclosure, the pin 550 and the rotary cover fixing member 540 are connected with each other in a non-rotatable way. In some embodiments, as shown in FIG. 10C, the pin 550 is integrally formed with the rotary cover fixing member 540. In some embodiments, the pin 550 and the rotary cover fixing member 540 may be formed separately and connected together. For example, the pin 550 and the rotary cover fixing member 540 may be connected to each other by an adhesive, threads, or the like.

According to some embodiments of the disclosure, the turning portion 530 and the rotary cover 510 are connected with each other in a non-rotatable way. In some embodiments, as shown in FIGS. 10C to 10E, the turning portion 530 is integrally formed with the rotary cover 510. However, the disclosure is not limited thereto. In some embodiments, the turning portion 530 and the rotary cover 510 may be formed separately and connected together. For example, the turning portion 530 and the rotary cover 510 may be connected to each other by an adhesive, threads, or the like.

According to some embodiments of the disclosure, the ventilation rate adjusting device 400 may adjust the ventilation rate of the ventilation channel by the rotation of the rotary cover 510 relative to the base 520. Specifically, the user manually turns the turning portion 530 to rotate the rotary cover 510 relative to the base 520, thereby opening or closing the ventilation channel or adjusting the opening degree thereof.

In some embodiment, that turning portion 530 includes a convex turning feature which may be designed to facilitate a touch by the user's hand for a turning operation. When the ventilation rate adjusting device 400 is mounted in the customized housing 100, the convex turning feature of the turning portion 530 may protrude from the outer surface of the customized housing 100 so as to be directly operated by the user's finger. The convex turning feature of the turning portion 530 may have a three-pointed star shape (as shown in FIGS. 10C to 10E), a triangularly-stacked shape, a three-strip shape, a concave strip shape or a striped shape, as long as it can be directly operated by the finger. The shape and configuration of the convex turning feature have been described above with reference to FIGS. 7A to 7E, and will not be repeated here.

The ventilation rate adjusting device 400 with a rotary-cover-with-opening structure according to some embodiments of the disclosure has been described above with reference to FIGS. 10A to 10E. However, those skilled in the art will appreciate that the rotary-cover-with-opening structure of the disclosure is not limited thereto. Hereinafter, a ventilation rate adjusting device with a rotary-cover-with-opening structure according to some embodiments of the disclosure will be described with reference to the drawings.

Figure 11A:
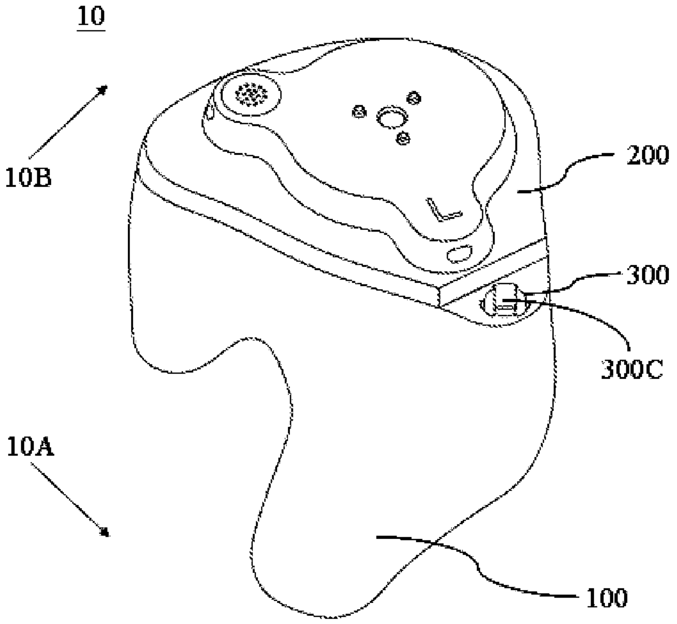
FIG. 11A shows a perspective view of an in-ear wireless earphone according to some embodiments of the disclosure.
Figure 11B:
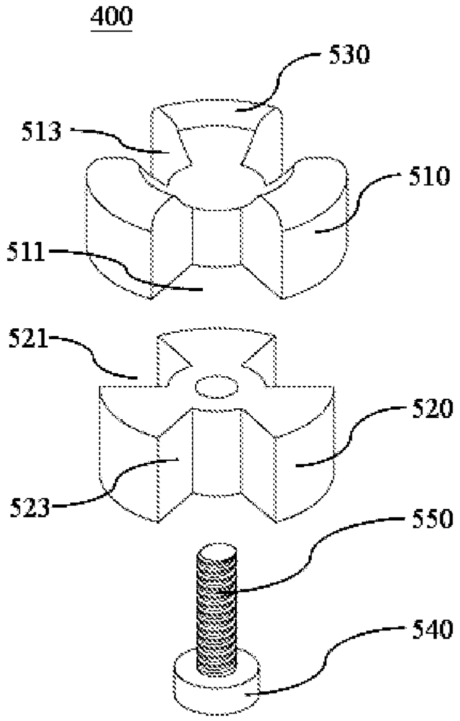
FIG. 11B shows an exploded view of a ventilation rate adjusting device of an in-ear wireless earphone according to some embodiments of the disclosure.
Figure 11C:
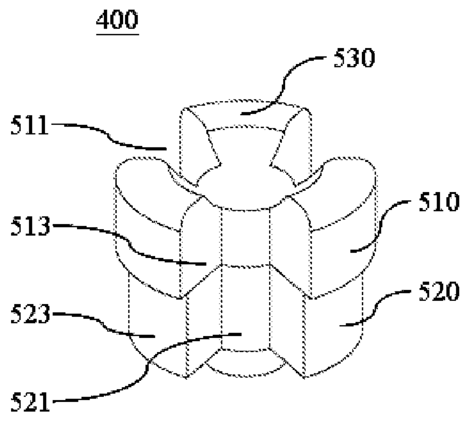
FIG. 11C shows a schematic view of a ventilation rate adjusting device in an open state according to some embodiments of the disclosure.
Figure 11D:
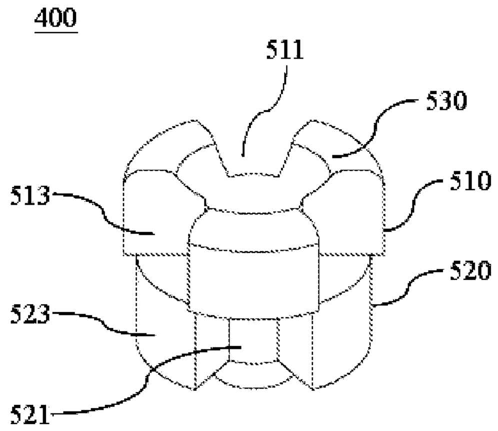
FIG. 11D shows a schematic view of a ventilation rate adjusting device in a closed state according to some embodiments of the disclosure.

FIG. 11A shows a perspective view of an in-ear wireless earphone according to some embodiments of the disclosure. FIG. 11B is an exploded view of a ventilation rate adjusting device of an in-ear wireless earphone according to some embodiments of the disclosure. FIG. 11C is a schematic view of a ventilation rate adjusting device in an open state according to some embodiments of the disclosure. FIG. 11D is a schematic view of a ventilation rate adjusting device in a closed state according to some embodiments of the disclosure.

As shown in FIG. 11A, the in-ear wireless earphone 10 includes a customized housing 100, a panel 200 and a ventilation hole 300. The ventilation hole 300 of the in-ear wireless earphone 10 is disposed in the customized housing 100, and includes a mounting position 300C for mounting a ventilation rate adjusting device 400 (not shown in FIG. 11A). In an exemplary embodiment, as shown in FIG. 11A, the mounting position 300C is set at a second orifice of the ventilation hole 300. In the embodiments shown in FIGS. 11A to 11D, please refer to the foregoing descriptions for other components and structures of the in-ear wireless earphone 10, which will not be repeated here.

According to some embodiments of the disclosure, as shown in FIGS. 11B to 11D, the ventilation rate adjusting device 400 includes a rotary cover 510 as the movable portion, a base 520 as the fixed portion, and a turning portion 530 as the operating portion. The rotary cover 510 includes an opening 511, and the base 520 includes an opening 521. The rotary cover 510 is rotatable relative to the base 520. Through the rotation of the rotary cover 510 relative to the base 520, the opening 511 of the rotary cover 510 and the opening 521 of the base 520 can be communicated with the ventilation hole 300, thereby achieving the ventilation of the ventilation channel.

As described above with reference to FIGS. 10A to 10E, the rotary cover 510 includes an annular portion 512 and the base 520 includes an annular portion 522. However, the disclosure is not limited thereto. In some embodiments, the rotary cover 510 and/or the base 520 may not have an annular portion. Unlike the embodiments shown in FIGS. 10A to 10E, the rotary cover 510 and the base 520 have no annular portion in the embodiments shown in FIGS. 11A to 11D.

As shown in FIGS. 11B to 11D, the rotary cover 510 includes connecting portions 513, and the base 520 includes connecting portions 523. The rotary cover 510 and the base 520 are disposed in the ventilation hole 300 through the connecting portions 513 and 523, respectively. Thus, the opening 511 of the rotary cover 510 is formed by being surrounded by the adjacent connecting portions 513 and the inner wall of the ventilation hole 300, and the opening 521 of the base 520 is formed by being surrounded by the adjacent connecting portions 523 and the inner wall of the ventilation hole 300.

In some embodiments, as shown in FIG. 11A, the ventilation hole 300 includes a clamping slot for receiving the connecting portion 523 of the base 520. When the base 520 of the ventilation rate adjusting device 400 is disposed in the ventilation hole 300, the connecting portion 523 of the base 520 is at least partially located in the corresponding clamping slot. Thus, the base 520 can be more stably disposed in the ventilation hole 300, thereby preventing the base 520 from rotating and facilitating the rotary cover 510 to be manually operated to rotate relative to the base 520.

In the embodiments shown in FIGS. 11A to 11D, please refer to the foregoing descriptions for other structures of the ventilation rate adjusting device 400, which will not be repeated here.

Figure 12A:
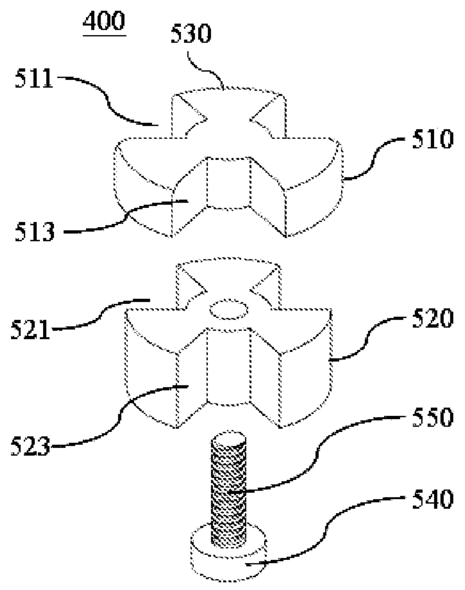
FIG. 12A shows an exploded view of a ventilation rate adjusting device of an in-ear wireless earphone according to some embodiments of the disclosure.
Figure 12B:
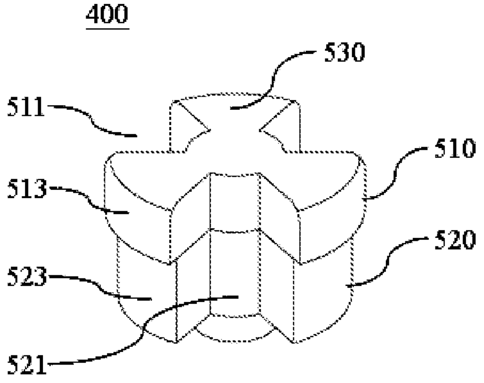
FIG. 12B shows a schematic view of a ventilation rate adjusting device in an open state according to some embodiments of the disclosure.
Figure 12C:
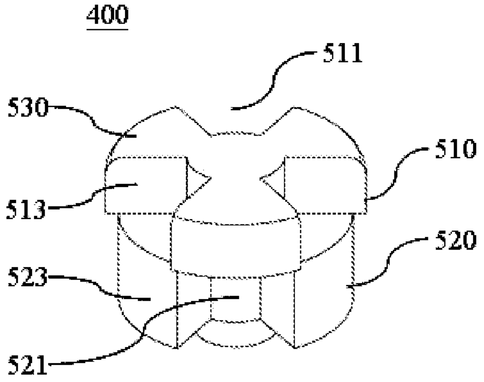
FIG. 12C shows a schematic view of a ventilation rate adjusting device in a closed state according to some embodiments of the disclosure.

FIG. 12A shows an exploded view of a ventilation rate adjusting device of an in-ear wireless earphone according to some embodiments of the disclosure. FIG. 12B shows a schematic view of a ventilation rate adjusting device in an open state according to some embodiments of the disclosure. FIG. 12C shows a schematic view of a ventilation rate adjusting device in a closed state according to some embodiments of the disclosure.

In some embodiments, as shown in FIGS. 10C to 11C, the turning portion 530 protrudes from the upper surface of the rotary cover 510. However, the disclosure is not limited thereto. In some embodiments, as shown in FIGS. 12A to 12C, the rotary cover 510 directly serves as the turning portion 530. For example, the upper surface of the ventilation rate adjusting device 400 is formed as a flat surface. Thus, the structure of the ventilation rate adjusting device 400 can be simplified, and the manufacturing cost of the ventilation rate adjusting device 400 can be reduced. In the embodiments shown in FIGS. 12A to 12C, please refer to the foregoing descriptions for other structures of the ventilation rate adjusting device 400, which will not be repeated here.

Figure 13A:
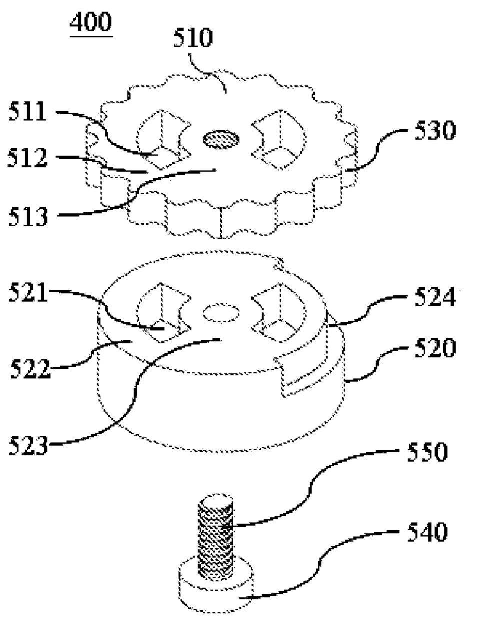
FIG. 13A shows an exploded view of a ventilation rate adjusting device of an in-ear wireless earphone according to some embodiments of the disclosure.
Figure 13B:
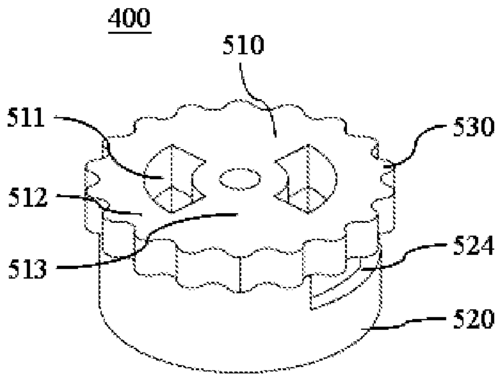
FIG. 13B shows a schematic view of a ventilation rate adjusting device in an open state according to some embodiments of the disclosure.
Figure 13C:
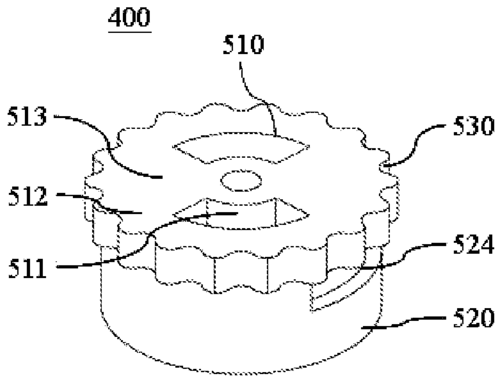
FIG. 13C shows a schematic view of a ventilation rate adjusting device in a closed state according to some embodiments of the disclosure.

FIG. 13A shows an exploded view of a ventilation rate adjusting device of an in-ear wireless earphone according to some embodiments of the disclosure. FIG. 13B shows a schematic view of a ventilation rate adjusting device in an open state according to some embodiments of the disclosure. FIG. 13C shows a schematic view of a ventilation rate adjusting device in a closed state according to some embodiments of the disclosure.

According to some embodiments of the disclosure, as shown in FIGS. 13A to 13C, the ventilation rate adjusting device 400 includes a rotary cover 510 as the movable portion, a base 520 as the fixed portion, and a turning portion 530 as the operating portion. The rotary cover 510 includes an opening 511, and the base 520 includes an opening 521. The rotary cover 510 is rotatable relative to the base 520. Through the rotation of the rotary cover 510 relative to the base 520, the opening 511 of the rotary cover 510 and the opening 521 of the base 520 can be communicated with each other and with the ventilation hole 300, thereby achieving the ventilation of the ventilation channel. In some embodiments, the ventilation rate adjusting device 400 may be mounted at a second orifice 300B of the ventilation hole 300 (as shown in FIG. 10B). In some embodiments, the ventilation rate adjusting device 400 may be mounted in the ventilation hole 300 at a position spaced apart from both a first orifice 300A and the second orifice 300B, i.e., at a middle position of the ventilation hole 300.

In some embodiments, as shown in FIGS. 13A to 13C, the rotary cover 510 includes an annular portion 512 and connecting portions 513 arranged in the annular portion 512. The opening 511 of the rotary cover 510 is formed by being surrounded by the annular portion 512 and the connecting portions 513. In addition, the base 520 includes an annular portion 522 and connecting portions 523 arranged in the annular portion 522. The opening 521 of the base 520 is formed by being surrounded by the annular portion 522 and the connecting portions 523. The base 520 is disposed in the ventilation hole 300 through the annular portion 522.

In some embodiments, as shown in FIGS. 10C to 11C, the turning portion 530 is disposed to at least partially overlap the rotary cover 510 in an axial direction of the rotary cover 510, and for example, the turning portion 530 protrudes from the upper surface of the rotary cover 510. However, the disclosure is not limited thereto. In some embodiments, as shown in FIGS. 13A to 13C, the turning portion 530 is disposed radially outside the rotary cover 510. In an exemplary embodiment, the turning portion 530 does not overlap the rotary cover 510 in the axial direction of the rotary cover 510. Since the turning portion 530 is disposed radially outside the rotary cover 510 so that the rotary cover 510 can be circumferentially rotated by the user's finger, the ventilation rate adjusting device 400 can be more conveniently disposed at the middle position of the ventilation hole 300.

In some embodiments, as shown in FIGS. 13A to 13C, the turning portion 530 may be disposed to have a toothed structure to facilitate a rotating operation by the user's finger. In some embodiments, as shown in FIGS. 13A to 13C, the base 520 may have a recessed portion 524 which causes the turning portion 530 to at least partially protrude relative to the base 520, so as to facilitate the rotating operation by the user's finger.

In the embodiments shown in FIGS. 13A to 13C, please refer to the foregoing descriptions for other structures of the ventilation rate adjusting device 400, which will not be repeated here.

As described above, the pin 550 is fixedly connected to (e.g., integrally formed with) the rotary cover fixing member 540, and then connected to the rotary cover 510. However, the disclosure is not limited thereto. In some embodiments, the pin 550 may be fixedly connected to (e.g., integrally formed with) the rotary cover 510 before being connected to the rotary cover fixing member 540. For example, the pin 550 and the rotary cover 510 may be connected to each other by an adhesive, threads, or the like or integrally formed. The specific connection mode has been described above with reference to FIGS. 4C to 6C and 8A to 9C, and will not be repeated here.

As described above, the turning portion 530 has a convex turning feature convenient to be directly operated by the finger. However, the disclosure is not limited thereto. In some embodiments, the turning portion 530 includes a concave turning feature. In some embodiments, when the ventilation rate adjusting device 400 is mounted in the customized housing 100, the concave turning feature of the turning portion 530 does not protrude from the outer surface of the customized housing 100, and needs to be turned by an external turning member (e.g., a dedicated rotation driving rod). The shape and configuration of the concave turning feature have been described above with reference to FIGS. 8A to 9C, and will not be repeated here.

As described above, the rotation axis of the rotary cover 510 is substantially parallel to the extending direction of the ventilation hole 300 at the ventilation rate adjusting device 400, and/or the extending direction of the ventilation hole 300 at the mounting position 300C is substantially straight. However, the disclosure is not limited thereto. Hereinafter, a ventilation rate adjusting device with a rotary-cover-with-opening structure according to some embodiments of the disclosure will be described with reference to the drawings.

Figure 14A:
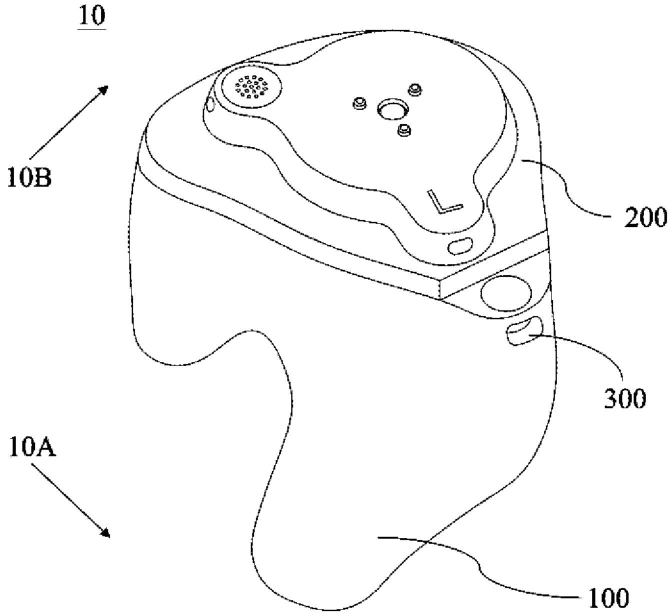
FIG. 14A shows a perspective view of an in-ear wireless earphone according to some embodiments of the disclosure.
Figure 14B:
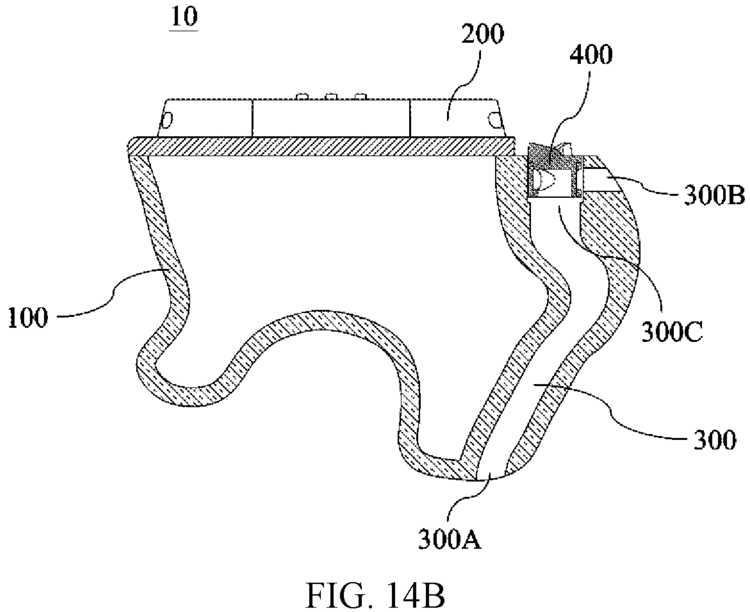
FIG. 14B shows a cross-sectional view of an in-ear wireless earphone according to some embodiments of the disclosure.
Figure 14C:
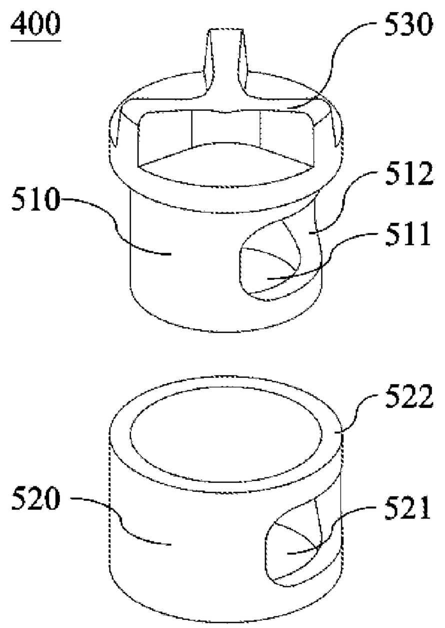
FIG. 14C shows an exploded view of a ventilation rate adjusting device of an in-ear wireless earphone according to some embodiments of the disclosure.
Figure 14D:
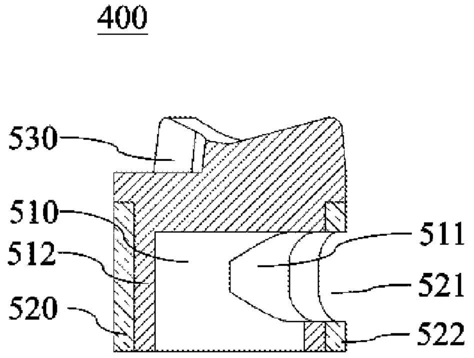
FIG. 14D shows a cross-sectional view of a ventilation rate adjusting device in an open state according to some embodiments of the disclosure.
Figure 14E:
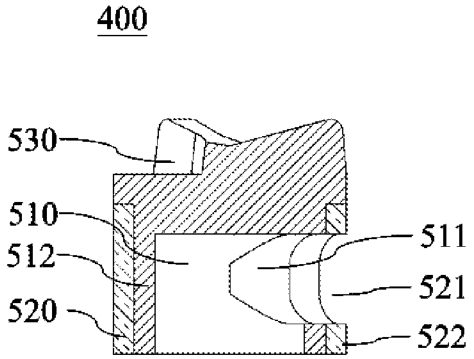
FIG. 14E shows a cross-sectional view of a ventilation rate adjusting device in a closed state according to some embodiments of the disclosure.

FIG. 14A shows a perspective view of an in-ear wireless earphone according to some embodiments of the disclosure. FIG. 14B shows a cross-sectional view of an in-ear wireless earphone according to some embodiments of the disclosure. FIG. 14C shows an exploded view of a ventilation rate adjusting device of an in-ear wireless earphone according to some embodiments of the disclosure. FIG. 14D shows a cross-sectional view of a ventilation rate adjusting device in an open state according to some embodiments of the disclosure. FIG. 14E shows a cross-sectional view of a ventilation rate adjusting device in a closed state according to some embodiments of the disclosure.

As shown in FIG. 14A, the in-ear wireless earphone 10 includes a customized housing 100, a panel 200 and a ventilation hole 300. As shown in FIG. 14B, the ventilation hole 300 of the in-ear wireless earphone 10 is disposed in the customized housing 100 and includes a mounting position 300C for mounting a ventilation rate adjusting device 400. In an exemplary embodiment, as shown in FIG. 14B, the mounting position 300C is set at a second orifice 300B of the ventilation hole 300. In the embodiments shown in FIGS. 14A to 14E, please refer to the foregoing descriptions for other components and structures of the in-ear wireless earphone 10, which will not be repeated here.

According to some embodiments of the disclosure, as shown in FIGS. 14C to 14E, the ventilation rate adjusting device 400 includes a rotary cover 510 as the movable portion, a base 520 as the fixed portion, and a turning portion 530 as the operating portion. The rotary cover 510 includes an opening 511, and the base 520 includes an opening 521. The rotary cover 510 is rotatable relative to the base 520. Through the rotation of the rotary cover 510 relative to the base 520, the opening 511 of the rotary cover 510 and the opening 521 of the base 520 can be communicated with each other and with the ventilation hole 300, thereby achieving the ventilation of the ventilation channel. In an exemplary embodiment, as shown in FIGS. 14C to 14E, the turning portion 530 is disposed to at least partially overlap the rotary cover 510 in an axial direction of the rotary cover 510, i.e., the turning portion 530 protrudes from an upper surface of the rotary cover 510. In an exemplary embodiment, the turning portion 530 is disposed on the second portion of the customized housing 100 and located at a position other than the second orifice 300B.

As described above with reference to FIGS. 10A to 13C, the rotary cover 510 includes connecting portions 513, wherein the opening 511 of the rotary portion 510 is at least partially surrounded by the connecting portions 513, and/or the base 520 includes connecting portions 523, wherein the opening 521 of the base 520 is at least partially surrounded by the connecting portions 523. However, the disclosure is not limited thereto. In some embodiments, the rotary cover 510 and/or the base 520 may not have a connecting portion. Unlike the embodiments shown in FIGS. 10A to 13C, the rotary cover 510 and the base 520 have no connecting portion in the embodiments shown in FIGS. 14A to 14E.

As shown in FIGS. 14C to 14E, the rotary cover 510 includes an annular portion 512 and the base 520 includes an annular portion 522. In an exemplary embodiment, the annular portion 512 of the rotary cover 510 is disposed in the annular portion 522 of the base 520 along a rotation axis of the rotary cover 510, i.e., surrounded by the annular portion 522 of the base 520. Thus, the rotary cover 510 and the base 520 are disposed in the ventilation hole 300 through the annular portion 522. In an exemplary embodiment, the opening 511 of the rotary cover 510 is formed in the annular portion 512, and the opening 521 of the base 520 is formed in the annular portion 522.

In addition, unlike the embodiments shown in FIGS. 10A to 13C, the extending direction of the ventilation hole 300 at the mounting position 300C is not substantially straight, but shaped as a folded line or a curve, such as a folded line representing an angle of 90°. Thus, the ventilation hole 300 has a bent section at least at the mounting position 300.

According to some embodiments of the disclosure, the ventilation rate adjusting device 400 may adjust the ventilation rate of the ventilation channel by the rotation of the cover 510 relative to the base 520. Specifically, the user manually turns the turning portion 530, so that the rotary cover 510 rotates relative to the base 520. The ventilation channel can be opened or closed by making the opening 511 of the rotary cover 510 and the opening 521 of the base 520 coincide with or separate from each other, or the opening degree of the ventilation channel can be adjusted by adjusting the degree of coincidence of the opening 511 of the rotary cover 510 and the opening 521 of the base 520.

In the embodiments shown in FIGS. 14A to 14E, please refer to the foregoing descriptions for other structures of the ventilation rate adjusting device 400, which will not be repeated here.

One-Way Valve Structure

Figure 15A:
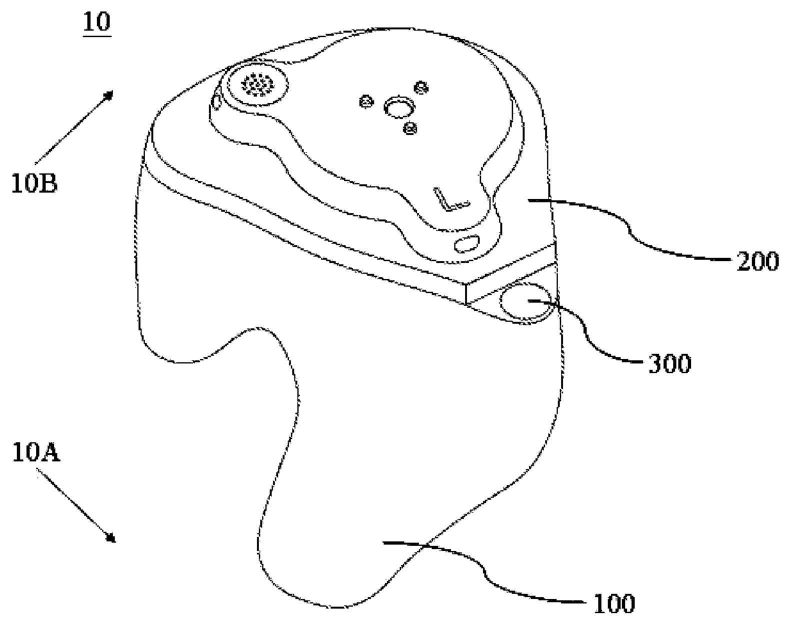
FIG. 15A shows a perspective view of an in-ear wireless earphone according to some embodiments of the disclosure.
Figure 15B:
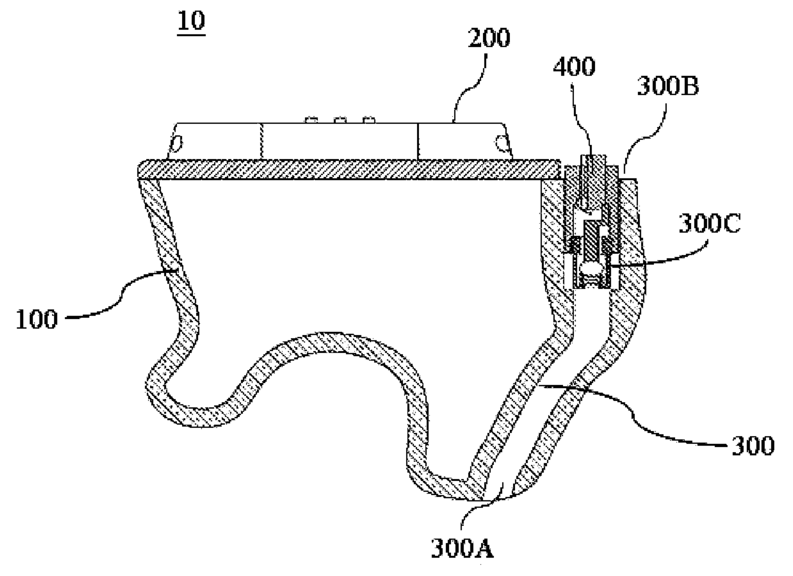
FIG. 15B shows a cross-sectional view of an in-ear wireless earphone according to some embodiments of the disclosure.
Figure 15C:
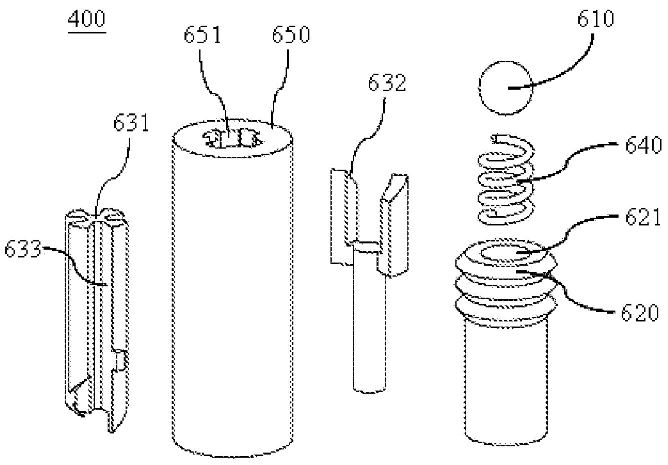
FIG. 15C shows an exploded view of a ventilation rate adjusting device of an in-ear wireless earphone according to some embodiments of the disclosure.
Figure 15D:
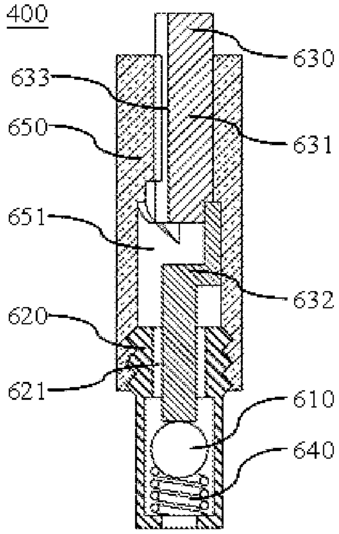
FIG. 15D shows a cross-sectional view of a ventilation rate adjusting device in an open state according to some embodiments of the disclosure.
Figure 15E:
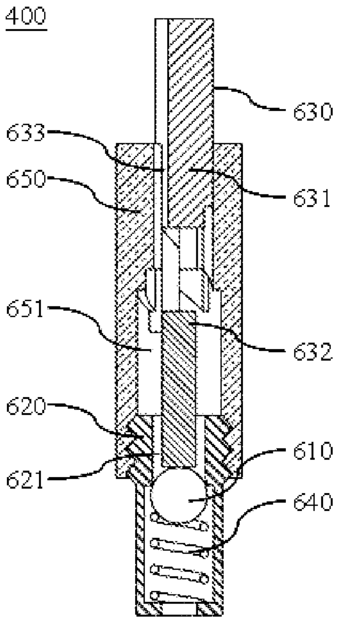
FIG. 15E shows a cross-sectional view of a ventilation rate adjusting device in a closed state according to some embodiments of the disclosure.

According to some embodiments of the disclosure, the ventilation rate adjusting device may adopt a one-way valve structure. FIG. 15A shows a perspective view of an in-ear wireless earphone according to some embodiments of the disclosure. FIG. 15B shows a cross-sectional view of an in-ear wireless earphone according to some embodiments of the disclosure. FIG. 15C shows an exploded view of a ventilation rate adjusting device of an in-ear wireless earphone according to some embodiments of the disclosure. FIG. 15D shows a cross-sectional view of a ventilation rate adjusting device in an open state according to some embodiments of the disclosure. FIG. 15E shows a cross-sectional view of a ventilation rate adjusting device in a closed state according to some embodiments of the disclosure.

As shown in FIG. 15A, the in-ear wireless earphone 10 includes a customized housing 100, a panel 200 and a ventilation hole 300. As shown in FIG. 15B, the ventilation hole 300 of the in-ear wireless earphone 10 is disposed in the customized housing 100, and includes a mounting position 300C for mounting a ventilation rate adjusting device 400. In an exemplary embodiment, as shown in FIG. 15B, the mounting position 300C is set at a second orifice 300B of the ventilation hole 300. In some embodiments, the mounting position 300C is set in the ventilation hole 300 at a position spaced apart from both a first orifice 300A and the second orifice 300B, i.e., at a middle position of the ventilation hole 300. Please refer to the foregoing descriptions for other components and structures of the in-ear wireless earphone 10, which will not be repeated here.

According to some embodiments of the disclosure, as shown in FIGS. 15C to 15E, the ventilation rate adjusting device 400 includes a valve core 610 as the movable portion, a valve seat 620 as the fixed portion, and a press portion 630 as the operating portion. The valve seat 620 includes a fluid channel 621 communicated with the ventilation hole. The valve core 610 is movable relative to the valve seat 620 to open and close the fluid channel 621. In an exemplary embodiment, the press portion 630 is disposed at the second orifice 300B of the ventilation hole 300.

According to some embodiments of the disclosure, the ventilation rate adjusting device 400 may adjust the ventilation rate of the ventilation channel by the moving of the valve core 610 relative to the valve seat 620. Specifically, the user manually presses the press portion 630 to move the valve core 610 relative to the valve seat 620, thereby opening or closing the ventilation channel or adjusting the opening degree thereof.

In some embodiments, as shown in FIGS. 15C to 15E, the ventilation rate adjusting device 400 further includes a spring 640 configured to apply an elastic force to the valve core 610. A pressing force applied to the press portion 630 by the user may be transferred to the valve core 610 to resist the elastic force of the spring 640, so that the valve core 610 approaches or moves away from the valve seat 620, thereby closing or opening the fluid channel 621.

In some embodiments, as shown in FIGS. 15C to 15E, the ventilation rate adjusting device 400 further includes a sleeve 650 having a sliding channel 651. The press portion 630 may move along the sliding channel 651 when being applied with a pressing force by the user.

In some embodiments, as shown in FIGS. 15C to 15E, the press portion 630 further includes an upper press lever 631 to be pressed by a user, and a lower press lever 632. The upper press lever 631 and the lower press lever 632 are movably connected and have structures matched with each other in shape. Through the cooperation of the upper press lever 631, the lower press lever 632, the spring 640 and the sleeve 650, the valve core 610 may be locked in a state of opening or closing the fluid channel 621 after the user presses the press portion 630, and may be locked in another state of opening or closing the fluid channel 621 after the user presses the press portion 630 again. In some embodiments, as shown in FIGS. 15C to 15E, the press portion 630 includes a ventilation groove 633 to facilitate the ventilation with the external environment.

In some embodiments, as shown in FIGS. 15A to 15E, a moving direction of the valve core 610 and a moving direction of the press portion 630 are substantially parallel to the extending direction of the ventilation hole 300 at the ventilation rate adjusting device 400. However, the disclosure is not limited thereto. In some embodiments, the moving direction of the valve core 610 and the moving direction of the press portion 630 are intersected with, e.g., substantially perpendicular to, the extending direction of the ventilation hole 300 at the ventilation rate adjusting device 400. In this case, the ventilation rate adjusting device 400 can be more conveniently disposed at the middle position of the ventilation hole 300.

Aperture Structure

Figure 16A:
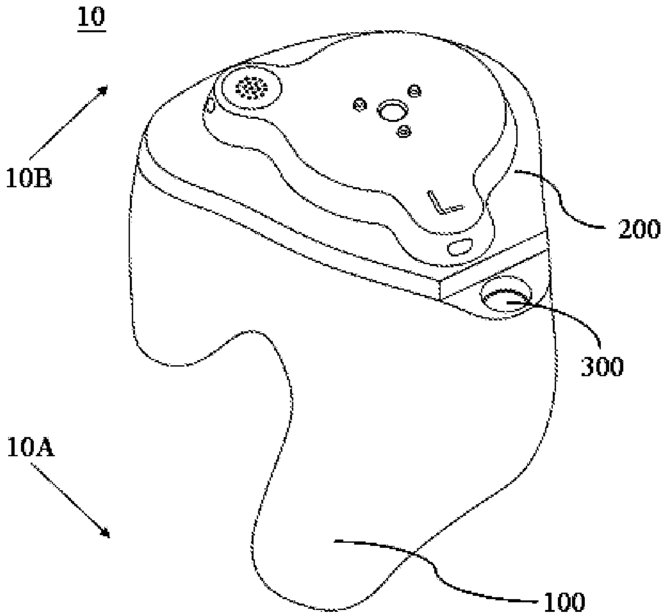
FIG. 16A shows a perspective view of an in-ear wireless earphone according to some embodiments of the disclosure.
Figure 16B:
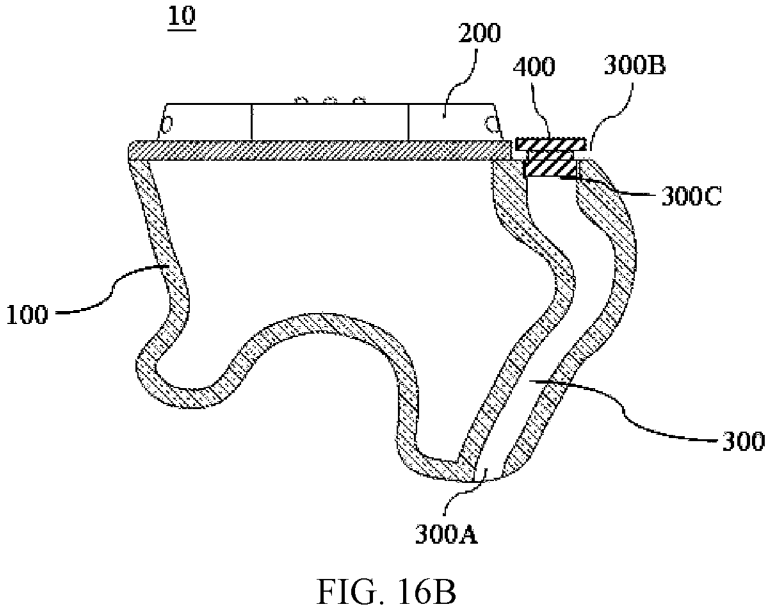
FIG. 16B shows a cross-sectional view of an in-ear wireless earphone according to some embodiments of the disclosure.
Figure 16C:
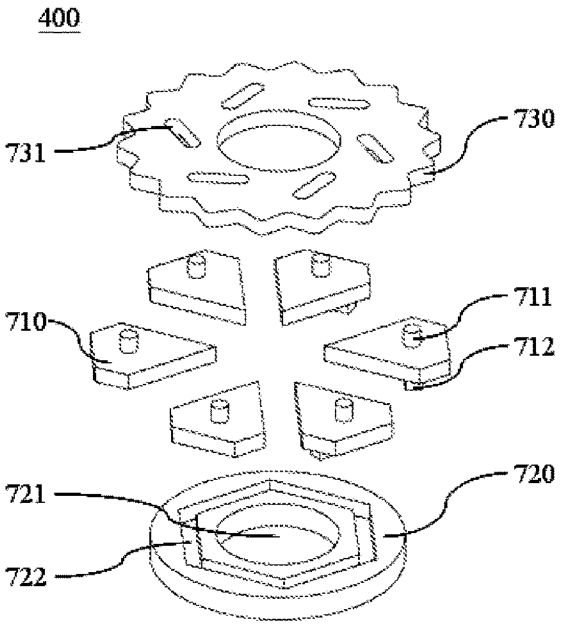
FIG. 16C shows an exploded view of a ventilation rate adjusting device of an in-ear wireless earphone according to some embodiments of the disclosure.
Figure 16D:
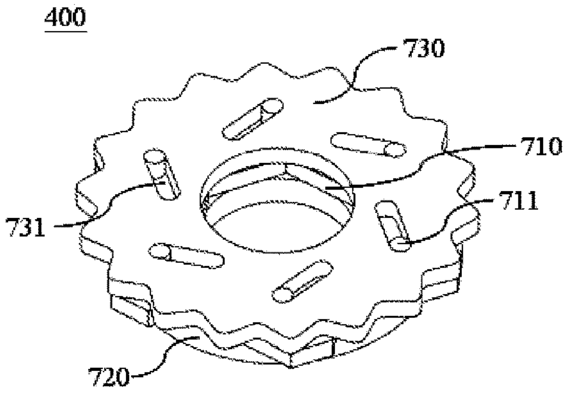
FIG. 16D shows a schematic view of a ventilation rate adjusting device in an open state according to some embodiments of the disclosure.
Figure 16E:
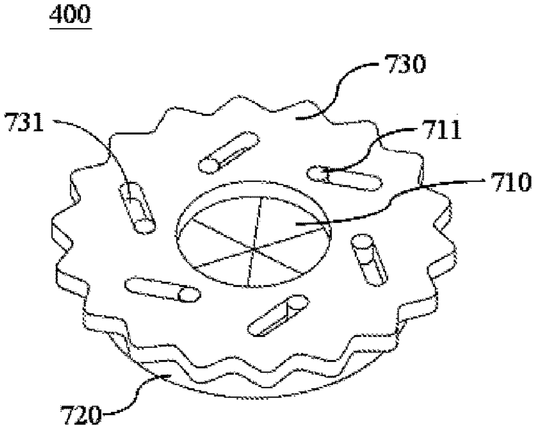
FIG. 16E shows a schematic view of a ventilation rate adjusting device in a closed state according to some embodiments of the disclosure.

According to some embodiments of the disclosure, the ventilation rate adjusting device may adopt an aperture structure. FIG. 16A shows a perspective view of an in-ear wireless earphone according to some embodiments of the disclosure. FIG. 16B shows a cross-sectional view of an in-ear wireless earphone according to some embodiments of the disclosure. FIG. 16C shows an exploded view of a ventilation rate adjusting device of an in-ear wireless earphone according to some embodiments of the disclosure. FIG. 16D shows a schematic view of a ventilation rate adjusting device in an open state according to some embodiments of the disclosure. FIG. 16E shows a schematic view of a ventilation rate adjusting device in a closed state according to some embodiments of the disclosure.

As shown in FIG. 16A, the in-ear wireless earphone 10 includes a customized housing 100, a panel 200 and a ventilation hole 300. As shown in FIG. 16B, the ventilation hole 300 of the in-ear wireless earphone 10 is disposed in the customized housing 100, and includes a mounting position 300C for mounting a ventilation rate adjusting device 400. In an exemplary embodiment, as shown in FIG. 16B, the mounting position 300C is set at a second orifice 300B of the ventilation hole 300. In some embodiments, the ventilation rate adjusting device 400 may be mounted in the ventilation hole 300 at a position spaced apart from both a first orifice 300A and the second orifice 300B, i.e., at a middle position of the ventilation hole 300. In the embodiments shown in FIGS. 16A to 16E, please refer to the foregoing descriptions for other components and structures of the in-ear wireless earphone 10, which will not be repeated here.

According to some embodiments of the disclosure, as shown in FIGS. 16C to 16E, the ventilation rate adjusting device 400 includes a plurality of blades 710 as the movable portion, a fixed seat 720 as the fixed portion, a rotary ring 730 as the operating portion. The fixed seat 720 includes a fluid channel 721 communicated with the ventilation hole 300. The rotary ring 730 may drive the blades 710 to move relative to the fixed seat 720. The rotary ring 730 is rotatable relative to the fixed seat 720. By the rotation of the rotary ring 730 relative to the fixed seat 720, the plurality of blades 710 may be spliced with each other to close, or separated from each other to open, the fluid channel 721 of the fixed seat 720, thereby adjusting the ventilation rate of the ventilation channel. In an exemplary embodiment, the rotary ring 730 is disposed at the second orifice 300B of the ventilation hole 300. In some embodiments, the rotary ring 730 is disposed on the second portion of the customized housing 100 and located at a position other than the second orifice 300B.

In an exemplary embodiment, as shown in FIGS. 16C to 16E, the blade 710 includes a first protrusion 711 protruding from one surface and a second protrusion 712 protruding from the other surface, the rotary ring 730 includes a driving groove 731 for matching with the first protrusion 711, and the fixed seat 720 includes a sliding groove 722 for matching with the second protrusion 712. When the rotary ring 730 rotates relative to the fixed seat 720, the first protrusion 711 of the blade 710 moves in the driving groove 731, and the second protrusion 712 moves in the sliding groove 722.

In an exemplary embodiment, a rotation axis of the rotary ring 730 is substantially parallel to an extending direction of the ventilation hole 300 at the ventilation rate adjusting device 400. However, the disclosure is not limited thereto. In some embodiments, the rotation axis of the rotary ring 730 is intersected with, e.g., substantially perpendicular to, the extending direction of the ventilation hole 300 at the ventilation rate adjusting device 400. In this case, the ventilation rate adjusting device 400 can be more conveniently disposed at the middle position of the ventilation hole 300.

According to some embodiments of the disclosure, the ventilation rate adjusting device 400 may move the blades 710 relative to the fixed seat 720 through the rotation of the rotary ring 730 relative to the fixed seat 720, so as to adjust the ventilation rate of the ventilation channel. Specifically, the user manually turns the rotary ring 730 to move the blades 710 relative to the fixing seat 720, thereby opening or closing the ventilation channel or adjusting the opening degree thereof.

Plug Structure

Figure 17A:
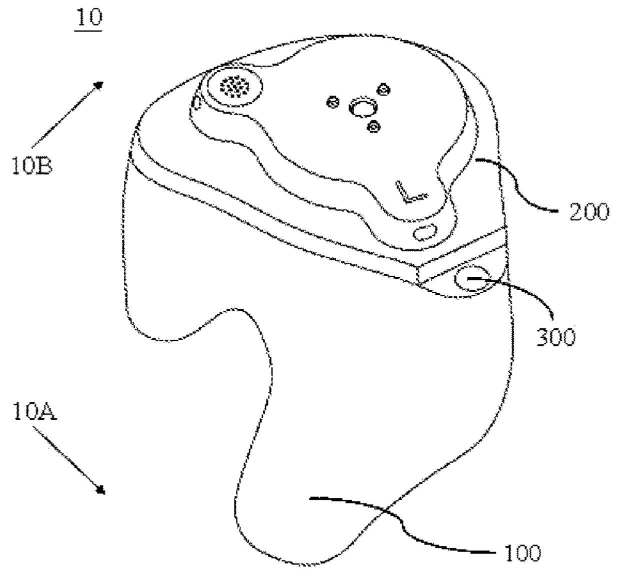
FIG. 17A shows a perspective view of an in-ear wireless earphone according to some embodiments of the disclosure.
Figure 17B:
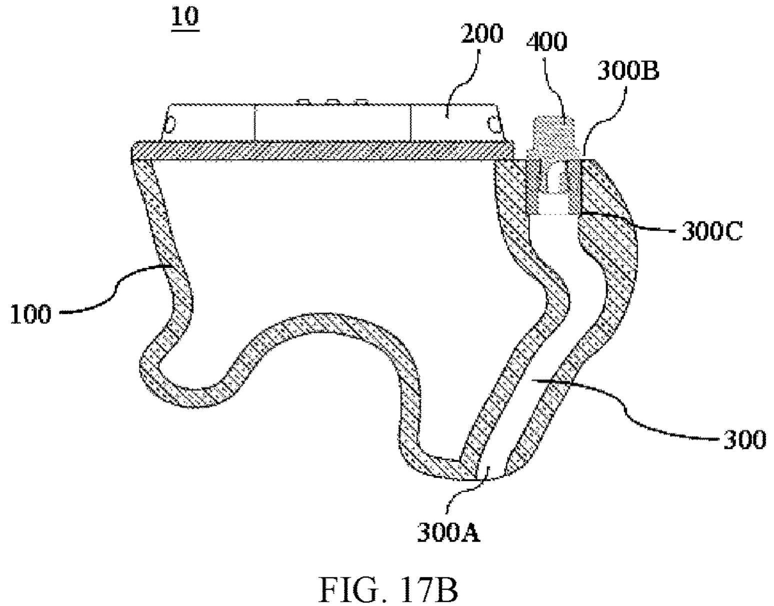
FIG. 17B shows a cross-sectional view of an in-ear wireless earphone according to some embodiments of the disclosure.
Figure 17C:
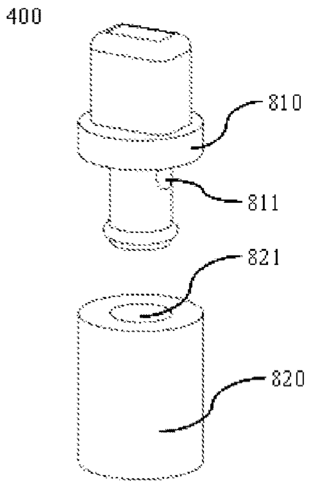
FIG. 17C shows an exploded view of a ventilation rate adjusting device of an in-ear wireless earphone according to some embodiments of the disclosure.
Figure 17D:
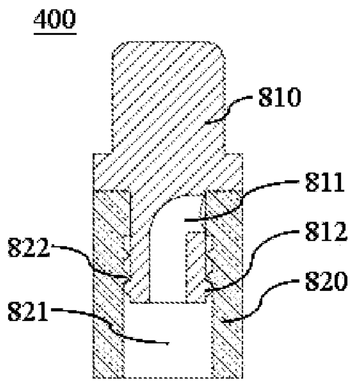
FIG. 17D shows a cross-sectional view of a ventilation rate adjusting device in a closed state according to some embodiments of the disclosure.
Figure 17E:
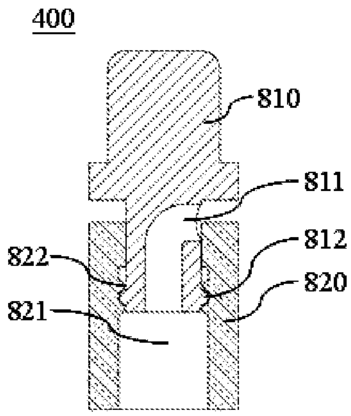
FIG. 17E shows a cross-sectional view of a ventilation rate adjusting device in an open state according to some embodiments of the disclosure.
Figure 17F:
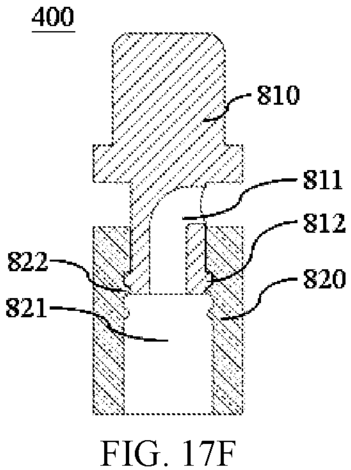
FIG. 17F shows a cross-sectional view of a ventilation rate adjusting device in an open state according to some embodiments of the disclosure.

According to some embodiments of the disclosure, the ventilation rate adjusting device may adopt a plug structure. FIG. 17A shows a perspective view of an in-ear wireless earphone according to some embodiments of the disclosure. FIG. 17B shows a cross-sectional view of an in-ear wireless earphone according to some embodiments of the disclosure. FIG. 17C shows an exploded view of a ventilation rate adjusting device of an in-ear wireless earphone according to some embodiments of the disclosure. FIG. 17D shows a cross-sectional view of a ventilation rate adjusting device in a closed state according to some embodiments of the disclosure. FIG. 17E shows a cross-sectional view of a ventilation rate adjusting device in an open state according to some embodiments of the disclosure. FIG. 17E shows a partial cross-sectional view of a ventilation rate adjusting device in an open state according to some embodiments of the disclosure. FIG. 17F shows a cross-sectional view of a ventilation rate adjusting device in a closed state according to some embodiments of the disclosure.

As shown in FIG. 17A, the in-ear wireless earphone 10 includes a customized housing 100, a panel 200 and a ventilation hole 300. As shown in FIG. 17B, the ventilation hole 300 of the in-ear wireless earphone 10 is disposed in the customized housing 100, and includes a mounting position 300C for mounting a ventilation rate adjusting device 400. In an exemplary embodiment, as shown in FIG. 17B, the mounting position 300C is set at a second orifice 300B of the ventilation hole 300. In some embodiments, the ventilation rate adjusting device 400 may be mounted in the ventilation hole 300 at a position spaced apart from both a first orifice 300A and the second orifice 300B, i.e., at a middle position of the ventilation hole 300. In the embodiments shown in FIGS. 17A to 17F, please refer to the foregoing descriptions for other components and structures of the in-ear wireless earphone 10, which will not be repeated here.

According to some embodiments of the disclosure, as shown in FIGS. 17C to 17F, the ventilation rate adjusting device 400 includes a plug 810 as both the movable portion and the operating portion, and a mounting seat 820 as the fixed portion. The mounting seat 820 includes a fluid channel 821 communicated with the ventilation hole 300. The mounting seat 820 is fixed in the ventilation hole 300. In an exemplary embodiment, the mounting seat 820 is an independent mounting seat, i.e., formed separately from the customized housing 100. The plug 810 may be inserted into or pulled out of the mounting seat 820. By pulling out or inserting the plug 810, the ventilation of the ventilation channel can be achieved or the opening degree of the ventilation channel can be adjusted.

In some embodiments, as shown in FIGS. 17D to 17F, when the ventilation of the ventilation channel is achieved, the plug 810 may be partially, rather than fully, pulled out of the mounting seat 820. Thus, in a process of gradually pulling the plug 810 out of the mounting seat 820, the plug 810 can be kept at different positions relative to the mounting seat 820, so as to achieve different degrees of ventilations. In some embodiments, as shown in FIGS. 17D to 17F, the plug 810 includes a limiting portion 812, and the mounting seat 820 includes a corresponding limiting portion 822. Thus, through a cooperation of the limiting portions 812 and 822, the plug 810 can be limited in at different levels relative to the mounting seat 820, so as to achieve different degrees of ventilations more easily.

As described above, the ventilation adjust device 400 with a plug structure according to some embodiment of the disclosure includes an independent mounting seat 820. However, those skilled in the art shall appreciate that the plug structure of the disclosure is not limited thereto. Hereinafter, a ventilation rate adjusting device having a plug structure according to some embodiments of the disclosure will be described with reference to the drawings.

Figure 18A:
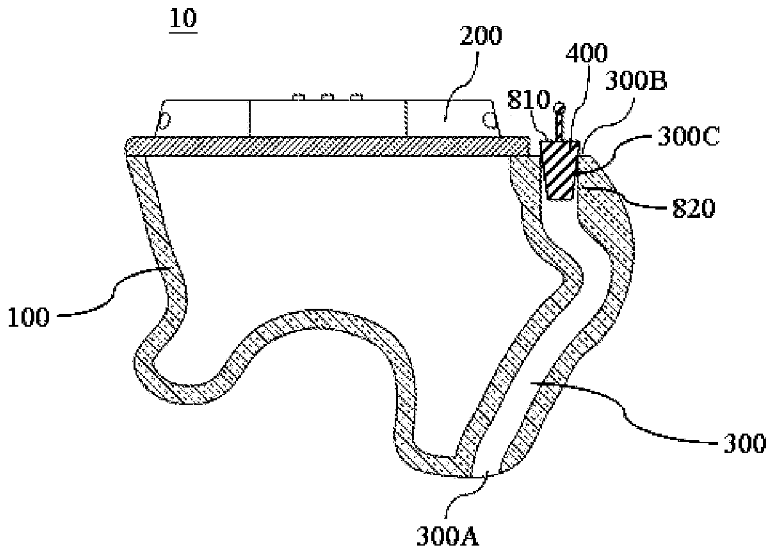
FIG. 18A shows a cross-sectional view of an in-ear wireless earphone according to some embodiments of the disclosure.
Figure 18B:
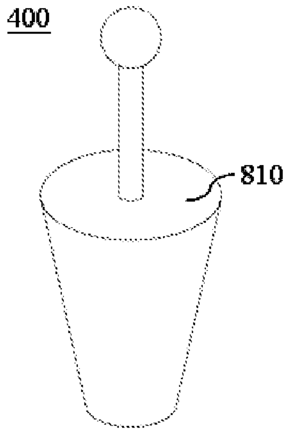
FIG. 18B shows a perspective view of a ventilation rate adjusting device of an in-ear wireless earphone according to some embodiments of the disclosure.
Figure 18C:
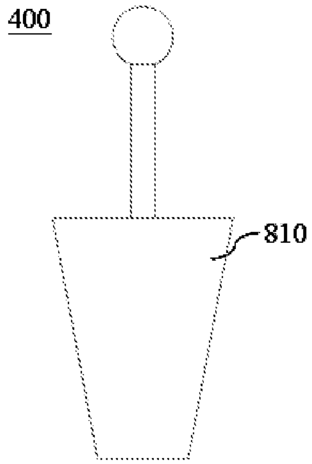
FIG. 18C shows a side view of a ventilation rate adjusting device of an in-ear wireless earphone according to some embodiments of the disclosure.

FIG. 18A shows a cross-sectional view of an in-ear wireless earphone according to some embodiments of the disclosure. FIG. 18B shows a perspective view of a ventilation rate adjusting device of an in-ear wireless earphone according to some embodiments of the disclosure. FIG. 18C shows a side view of a ventilation rate adjusting device of an in-ear wireless earphone according to some embodiments of the disclosure.

As shown in FIG. 18A, the in-ear wireless earphone 10 includes a customized housing 100, a panel 200 and a ventilation hole 300. The ventilation hole 300 of the in-ear wireless earphone 10 is disposed in the customized housing 100 and includes a mounting position 300C for mounting a ventilation rate adjusting device 400. In an exemplary embodiment, as shown in FIG. 18A, the mounting position 300C is set at a second orifice 300B of the ventilation hole 300. In some embodiments, the ventilation rate adjusting device 400 may be mounted in the ventilation hole 300 at a position spaced apart from both a first orifice 300A and the second orifice 300B, i.e., at a middle position of the ventilation hole 300. In the embodiments shown in FIGS. 18A to 18C, please refer to the foregoing descriptions for other components and structures of the in-ear wireless earphone 10, which will not be repeated here.

According to some embodiments of the disclosure, as shown in FIGS. 18A to 18C, the ventilation rate adjusting device 400 includes a plug 810 as the movable portion and the operating portion. As described above with reference to FIGS. 17A to 17F, the ventilation rate adjustment device 400 includes an independent mounting seat. However, the disclosure is not limited thereto. In some embodiments, the mounting seat may be formed by the customized housing 100. Unlike the embodiments shown in FIGS. 17A to 17F, the mounting seat 820 is formed by the customized housing 100 in the embodiments shown in FIGS. 18A to 18C. In an exemplary embodiment, the mounting seat 820 is integrally formed with the customized housing 100. The plug 810 may be inserted into or pulled out of the mounting seat 820. By pulling out or inserting the plug 810, the ventilation of the ventilation channel can be achieved or the opening degree of the ventilation channel can be adjusted.

In the embodiments shown in FIG. 18A to FIG. 18C, please refer to the foregoing descriptions for other structures of the ventilation rate adjusting device 400, which will not be repeated here.

Cover Structure

Figure 19A:
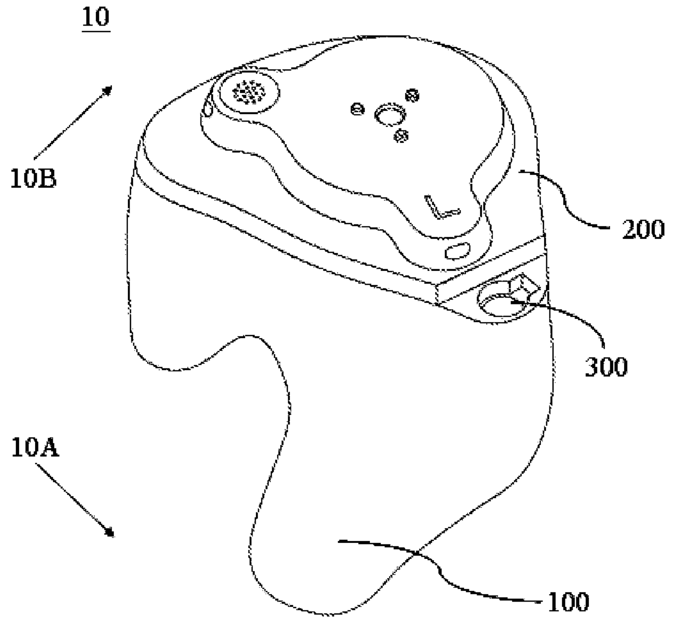
FIG. 19A shows a perspective view of an in-ear wireless earphone according to some embodiments of the disclosure.
Figure 19B:
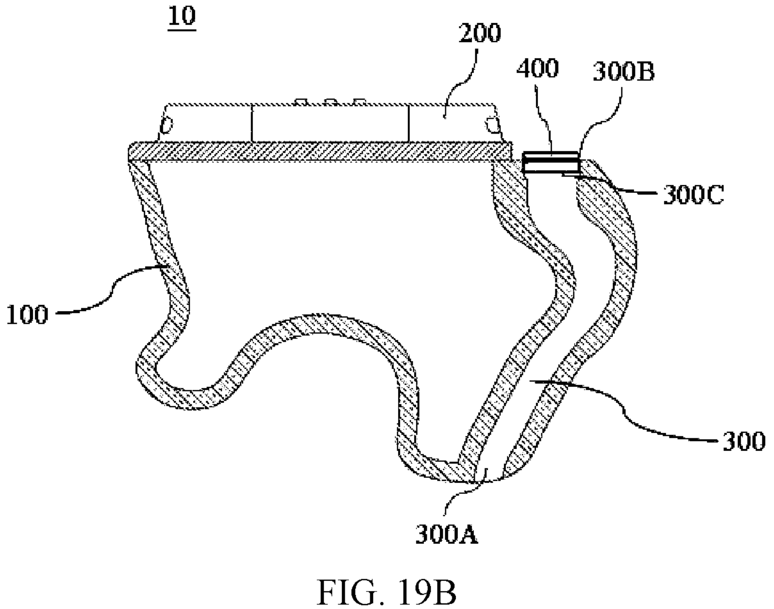
FIG. 19B shows a cross-sectional view of an in-ear wireless earphone according to some embodiments of the disclosure.
Figure 19C:
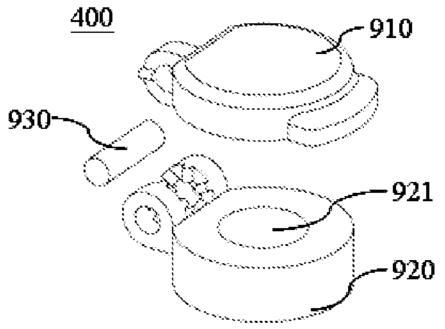
FIG. 19C shows an exploded view of a ventilation rate adjusting device of an in-ear wireless earphone according to some embodiments of the disclosure.
Figure 19D:
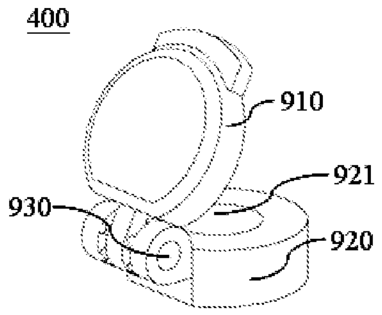
FIG. 19D shows a schematic view of a ventilation rate adjusting device in an open state according to some embodiments of the disclosure.
Figure 19E:
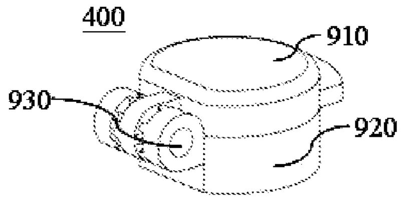
FIG. 19E shows a schematic view of a ventilation rate adjusting device in a closed state according to some embodiments of the disclosure.

According to some embodiments of the disclosure, the ventilation rate adjusting device may adopt a cover structure. FIG. 19A shows a perspective view of an in-ear wireless earphone according to some embodiments of the disclosure. FIG. 19B shows a cross-sectional view of an in-ear wireless earphone according to some embodiments of the disclosure. FIG. 19C shows an exploded view of a ventilation rate adjusting device of an in-ear wireless earphone according to some embodiments of the disclosure. FIG. 19D shows a schematic view of a ventilation rate adjusting device in an open state according to some embodiments of the disclosure. FIG. 19E shows a schematic view of a ventilation rate adjusting device in a closed state according to some embodiments of the disclosure.

As shown in FIG. 19A, the in-ear wireless earphone 10 includes a customized housing 100, a panel 200 and a ventilation hole 300. As shown in FIG. 19B, the ventilation hole 300 of the in-ear wireless earphone 10 is disposed in the customized housing 100, and includes a mounting position 300C for mounting a ventilation rate adjusting device 400 (not shown in FIG. 19A). In an exemplary embodiment, as shown in FIG. 19B, the mounting position 300C is set at a second orifice 300B of the ventilation hole 300. In some embodiments, the ventilation rate adjusting device 400 may be mounted in the ventilation hole 300 at a position spaced apart from both a first orifice 300A and the second orifice 300B, i.e., at a middle position of the ventilation hole 300. In the embodiments shown in FIGS. 19A to 19E, please refer to the foregoing descriptions for other components and structures of the in-ear wireless earphone 10, which will not be repeated here.

According to some embodiments of the disclosure, as shown in FIGS. 19C to 19E, the ventilation rate adjusting device 400 includes a cover 910 as both the movable portion and the operating portion and an engagement seat 920 as the fixed portion. The engagement seat 920 includes a fluid channel 921 communicated with the ventilation hole 300. The cover 910 is pivotally connected to the engagement seat 920. The cover 910 is movable relative to the engagement seat 920. In an exemplary embodiment, as shown in FIGS. 19C to 19E, the ventilation rate adjusting device 400 includes a pivot 930 through which the cover 910 and the engagement seat 920 are pivotally connected to each other. In some embodiments, the cover 910 and the engagement seat 920 respectively include magnets causing the cover 910 and the engagement seat 920 to be attracted by each other when the cover 910 is put down.

According to some embodiments of the disclosure, the ventilation rate adjusting device 400 may adjust the ventilation rate of the ventilation channel when the cover 910 is lifted up from the engagement seat 920 or when the cover 910 is put down on the engagement seat 920. Specifically, the user manually lifts up or put down the cover 910, so that the cover 910 moves relative to the engagement seat 920 to open or close the fluid channel 921 of the engagement seat 920, thereby opening or closing the ventilation channel or adjusting the opening degree thereof.

As described above, the ventilation hole 300 is completely disposed in the customized housing 100. However, the disclosure is not limited thereto. In some embodiments, the ventilation hole 300 of the in-ear wireless earphone 10 may include a first hole section located in the customized housing 100 and a second hole section located in the panel 200, whereby the ventilation channel includes a first section disposed in the customized housing 100 and a second section disposed in the panel 200. In this case, the ventilation rate adjusting device 400 according to the embodiment of the disclosure may be disposed in the second hole section of the ventilation hole 300 located in the panel 200.

The disclosure relates to an in-ear wearable device. The disclosure provides an in-ear wearable device, comprising: a customized housing having a housing wall and an inner cavity, the customized housing comprising a first portion for being inserted into an acoustic meatus of a user and matching with the shape of the acoustic meatus, and a second portion for being exposed to an external environment when the first portion is inserted into the acoustic meatus; a panel; a ventilation hole at least partially disposed in the customized housing, wherein a section of the ventilation hole disposed in the customized housing is formed in the housing wall; and a ventilation rate adjusting device mounted in the ventilation hole, wherein the ventilation hole and the ventilation rate adjusting device constitute at least a part of a ventilation channel isolated from the inner cavity, the ventilation channel is configured to fluidly connect the acoustic meatus to the external environment when the user wears the in-ear wireless earphone, and the ventilation rate adjusting device comprises an operating portion located on the second portion and exposed from an outer surface of the customized housing, and is configured to be manually operable to adjust a ventilation rate of the ventilation channel with the operating portion to adjust audio characteristics of the in-ear wearable device.

Although the disclosure has been described with reference to the exemplary embodiments, it shall be appreciated that the disclosure is not limited to the configurations and methods of the above embodiments. On the contrary, the disclosure is intended to cover various modifications and equivalent arrangements. In addition, although various elements and methodical steps of the disclosed invention are illustrated in various exemplary combinations and configurations, other combinations including more or less elements or methods shall also fall within the scope of the disclosure.

LIST OF THE REFERENCE SIGNS

10: in-ear wireless earphone;
10A: first side;
10B: second side;
100: customized housing;
110: housing wall;
120: inner cavity;
130: first protruding portion;
140: second protruding portion;
200: panel;
300: ventilation hole;
300A: first orifice;
300B: second orifice;
300C: mounting position;
400: ventilation rate adjusting device;
410: valve plate;
411: extending portion;
420: valve body;
421: opening;
430: turning portion;
440: valve plate fixing member;
510: rotary cover;
511: opening;
512: annular portion;
513: connecting portion;
520: base;
521: opening;
522: annular portion;
523: connecting portion;
524: recessed portion;
530: turning portion;
540: rotary cover fixing member;
550: pin;
610: valve core;
620: valve seat;
621: fluid channel;
630: press portion;
631: upper press lever;
632: lower press lever;
633: ventilation groove;
640: spring;
650: sleeve;
710: blade;
711: first protrusion;
712: second protrusion;
720: fixed seat;
721: fluid channel;
722: sliding groove;
730: rotary ring;
810: plug;
811: fluid channel;
812: limiting portion;
820: mounting seat;
821: fluid channel;
822: limiting portion;
910: cover;
920: engagement seat;
921: fluid channel; and
930: pivot.

The invention claimed is:

1. An in-ear wearable device, comprising:

a customized housing having a housing wall and an inner cavity surrounded by the housing wall, wherein the customized housing comprises a first portion for being inserted into an acoustic meatus of a user and matching with a shape of the acoustic meatus, and a second portion for being exposed to an external environment when the first portion is inserted into the acoustic meatus;

a panel mounted to the customized housing at an open end of the second portion away from the first portion;

a ventilation hole at least partially disposed in the customized housing, wherein a section of the ventilation hole disposed in the customized housing is formed in the housing wall, the ventilation hole comprises a first orifice for being exposed to the acoustic meatus and a second orifice for being exposed to the external environment when the user wears the in-ear wearable device; and a ventilation rate adjusting device mounted in the ventilation hole, wherein the ventilation hole and the ventilation rate adjusting device constitute a ventilation channel which is isolated from the inner cavity of the customized housing, the ventilation channel is configured to fluidly connect the acoustic meatus of the user to the external environment when the user wears the in-ear wearable device, the ventilation rate adjusting device comprises an operating portion located on the second portion, disposed at the second orifice of the ventilation hole, and exposed from an outer surface of the customized housing, and the ventilation rate adjusting device is configured to be manually operable to adjust a ventilation rate of the ventilation channel with the operating portion to adjust audio characteristics of the in-ear wearable device, wherein the ventilation rate adjusting device further comprises a movable portion and a fixed portion;

wherein the ventilation rate adjusting device adopts a one-way valve structure and comprises a valve core as the movable portion, a valve seat as the fixed portion, a press portion as the operating portion, and a spring configured to apply an elastic force to the valve core, the valve seat comprises a fluid channel communicated with the ventilation hole, and the ventilation rate adjusting device is configured to move the valve core relative to the valve seat against the elastic force of the spring when the press portion is pressed, so as to adjust the ventilation rate of the ventilation channel; and wherein a moving direction of the valve core is substantially parallel to an extending direction of the ventilation hole at the ventilation rate adjusting device.

2. The in-ear wearable device according to claim 1, wherein the ventilation channel is completely disposed in the customized housing.

3. The in-ear wearable device according to claim 1, wherein the ventilation channel is a bent channel.

4. The in-ear wearable device according to claim 1, wherein the ventilation rate adjusting device is configured to be manually operable to switch between a fully open state for fully opening the ventilation channel and a fully closed state for fully closing the ventilation channel.

5. The in-ear wearable device according to claim 1, wherein the customized housing has an integral structure.

6. The in-ear wearable device according to claim 1, wherein the in-ear wearable device is an in-ear wireless earphone.

* * * * *